United States Patent [19]
Toda

[11] Patent Number: 5,852,433
[45] Date of Patent: Dec. 22, 1998

[54] ELASTIC WAVE POSITION-SENSING DEVICE

[76] Inventor: Kohji Toda, 1-49-18 Futaba, Yokosuka 239, Japan

[21] Appl. No.: 694,987
[22] Filed: Aug. 9, 1996
[51] Int. Cl.$^6$ ....................................................... G09G 5/00
[52] U.S. Cl. ............................ 345/173; 345/156; 178/18
[58] Field of Search ...................................... 345/177, 173, 345/174, 175, 176, 179, 156, 157; 341/22; 178/18, 19

[56] References Cited

U.S. PATENT DOCUMENTS

| 4,825,212 | 4/1989 | Adler et al. | 345/177 |
| 5,329,070 | 7/1994 | Knowles | 345/177 |
| 5,591,945 | 1/1997 | Kent | 345/177 |

Primary Examiner—Dennis-Doon Chow

[57] ABSTRACT

An elastic wave position-sensing device comprising at least two elastic wave transducing units X and Y having N propagation lanes $U_{Xi}$ (i=1, 2, ..., N) and $U_{Yi}$ (i=1, 2, ..., N), respectively, a nonpiezoelectric plate, a display panel mounted on one end surface of the nonpiezoelectric plate, and a controlling system connected with the units X and Y. Each unit includes a piezoelectric substrate $P_T$, a piezoelectric substrate $P_R$, at least an input interdigital transducer formed on one end surface of the piezoelectric substrate $P_T$, and at least an output interdigital transducer formed on one end surface of the piezoelectric substrate $P_R$. Each piezoelectric substrates mounted on one or the other end surface of the nonpiezoelectric plate and the nonpiezoelectric plate form N bilayer zones $L_{Ti}$ (i=1, 2, ..., N), a bilayer zone $L_R$, and a monolayer zone between the bilayer zones $L_{Ti}$ and the bilayer zone $L_R$. When an electric signal $E_T$ is applied to the input interdigital transducer, an elastic wave is excited in the bilayer zone $L_{Ti}$. The elastic wave is transmitted to the bilayer zone $L_R$ through the monolayer zone, and is transduced to an electric signal $E_R$. If touching a crossing point of the lanes $U_{Xi}$ and $U_{Yi}$ on the other end surface of the nonpiezoelectric plate, the elastic wave is intercepted at the crossing point. Therefore, the magnitude of the electric signal $E_R$ corresponding to the crossing point decrease or disappearance. Thus, it is possible to specify the crossing point.

13 Claims, 16 Drawing Sheets 5,852,433

ELASTIC WAVE POSITION-SENSING DEVICE

BACKGROUND OF THE INVENTION

1. Field of the Invention

The present invention relates to an elastic wave device for sensing a touch-position on a nonpiezoelectric plate having at least two elastic wave transducing units.

2. Description of the Prior Art.

A resistance-film form of conventional touch panels has an electrically conductive transparent film, the magnitude of the resistance thereof changing when touching thereon. The resistance-film form of conventional touch panels is operated under low power consumption, however has some problems on response time, sensitivity, durability and others. An ultrasonic form of conventional touch panels has a nonpiezoelectric plate under acoustic vibration, which is decreased or disappeared when touching on the nonpiezoelectric plate. Conventional methods for exciting the acoustic vibration on a nonpiezoelectric plate generally include a wedge-shaped transducer with a bulk wave vibrator for vibrating a nonpiezoelectric plate indirectly, or a piezoelectric thin film transducer for vibrating a nonpiezoelectric plate directly. The wedge-shaped transducer is mainly used for a non-destruction evaluation by ultrasound under a comparative low frequency operation alone because of the difficulty on manufacturing accuracy of the wedge angle and so on. The piezoelectric thin film transducer consists of a nonpiezoelectric plate, a piezoelectric thin film mounted on the nonpiezoelectric plate and made from ZnO and others, and interdigital transducers exciting the acoustic vibration on the nonpiezoelectric plate. Because of various transmission characteristics of the interdigital transducers with various structures, the piezoelectric thin film transducer is used as a high frequency device, however has operation frequencies limited to the UHF and VHF bands, and has some problems on manufacturing and mass production.

Thus, there are some problems on response time, sensitivity, durability, manufacturing, mass production, errors of frequent occurrence, difficulty in use, operation frequencies, and high voltage operation with high power consumption in conventional touch panels.

SUMMARY OF THE INVENTION

An object of the present invention is to provide an elastic wave position-sensing device capable of specifying a touch-position on the nonpiezoelectric plate with a finger or others under a fixed or more pressure with a high sensitivity and a quick response time.

Another object of the present invention is to provide an elastic wave position-sensing device excellent in durability, manufacturing, mass-production.

Another object of the present invention is to provide an elastic wave position-sensing device without excessive sensitivity causing errors of frequent occurrence.

Another object of the present invention is to provide an elastic wave position-sensing device being easy to use.

A still other object of the present invention is to provide an elastic wave position-sensing device operating under low power consumption with low voltage.

A still further object of the present invention is to provide an elastic wave position-sensing device with a small size which is very light in weight and has a simple structure.

According to one aspect of the present invention there is provided an elastic wave transducing device comprising at least two elastic wave transducing units X and Y, a nonpiezoelectric plate, a display panel mounted on one end surface of the nonpiezoelectric plate, and a controlling system connected with the elastic wave transducing units X and Y and the display panel. Each elastic wave transducing unit consists of piezoelectric substrates $P_T$ and $P_R$ mounted on one or the other end surface of the nonpiezoelectric plate, N interdigital transducers $I_{Ti}$ (i=1, 2, ..., N), an interdigital transducer $I_R$, and N switches $C_i$ (i=1, 2, ..., N). The piezoelectric substrate $P_T$ comprises N piezoelectric parts $P_{Ti}$ (i=1, 2, ..., N), each interdigital transducer $I_{Ti}$ being formed on one end surface of each piezoelectric part $P_{Ti}$. The interdigital transducer $I_R$ is formed on one end surface of the piezoelectric substrate $P_R$. The thickness D of the piezoelectric substrates $P_T$ and $P_R$ is approximately equal to or smaller than an interdigital periodicity p of the interdigital transducer $I_{Ti}$. An output terminal of each switch $C_i$ is connected with an input terminal of each interdigital transducer $I_{Ti}$. The thickness of the nonpiezoelectric plate is equal to or smaller than the thickness D of the piezoelectric substrates $P_T$ and $P_R$. The nonpiezoelectric plate comprises N nonpiezoelectric parts $_{Ti}$ (i=1, 2, ..., N) adjacent to the piezoelectric parts $P_{Ti}$, a nonpiezoelectric part $_R$ adjacent to the piezoelectric substrate $P_R$, and the remaining nonpiezoelectric part. The piezoelectric substrates $P_T$ and $P_R$, and the nonpiezoelectric plate form N bilayer zones $L_{Ti}$ (i=1, 2, ..., N) consisting of the piezoelectric parts $P_{Ti}$ and the nonpiezoelectric parts $_{Ti}$, a bilayer zone $L_R$ consisting of the piezoelectric substrate $P_R$ and the nonpiezoelectric part $_R$, and a monolayer zone between the bilayer zones $L_{Ti}$ and the bilayer zone $L_R$, and consisting of the remaining nonpiezoelectric part.

The interdigital transducer $I_{Ti}$ receives an electric signal $E_T$ with a frequency approximately corresponding to the interdigital periodicity p, and excites an elastic wave of the $S_o$ mode and the higher order modes in the bilayer zone $L_{Ti}$. The elastic wave, having the wavelength approximately equal to the interdigital periodicity p, is transmitted to the bilayer zone $L_R$ through the monolayer zone. In this time, the phase velocity of the elastic wave is approximately equal to the phase velocity $V_{fd=0}$, of the $S_o$ mode elastic wave, corresponding to a condition that the product FD of the frequency F of the elastic wave and the thickness D of the piezoelectric substrate $P_T$ is zero.

The interdigital transducer $I_R$ transduces the elastic wave in the bilayer zone $L_R$ to an electric signal $E_R$ with a frequency approximately corresponding to the interdigital periodicity p.

The nonpiezoelectric plate is made of a material such that the phase velocity of the elastic wave in the nonpiezoelectric plate alone is approximately equal to that in the piezoelectric substrates $P_T$ and $P_R$ alone.

The controlling system turns on and off the switches $C_i$ with a fixed period in turn, keeps a check on a magnitude of the electric signal $E_R$, senses a touch with a finger or others under a fixed or more pressure on the other end surface of the nonpiezoelectric plate by a decrease or a disappearance in magnitude of the electric signal $E_R$, picks out one of the switches $C_i$ turned on when the decrease or the disappearance in magnitude of the electric signal $E_R$ happens, specifies a touch-position corresponding with the picked out switch $C_i$, and produces an image corresponding to the touch-position on the display panel.

The elastic wave transducing unit X has N propagation lanes $U_{Xi}$ (i=1, 2, ..., N) of the elastic wave in the monolayer zone between the bilayer zones $L_{Ti}$ and $L_R$, two neighbors of the propagation lanes $U_{Xi}$ being closed or partially overlapping each other.

The elastic wave transducing unit Y has N propagation lanes $U_{Yi}$ (i=1, 2, . . . , N) of the elastic wave in the monolayer zone between the bilayer zones $L_{Ti}$ and $L_R$, two neighbors of the propagation lanes $U_{Yi}$ being closed or partially overlapping each other, the propagation lane $U_{Xi}$ being vertical to the propagation lane $U_{Yi}$.

According to another aspect of the present invention there is provided a nonpiezoelectric plate made of a glass.

According to another aspect of the present invention there is provided a piezoelectric ceramic as the piezoelectric substrates $P_T$ and $P_R$, the polarization axis thereof being parallel to the direction of the thickness D thereof.

According to another aspect of the present invention there is provided a piezoelectric polymer such as PVDF and so on, as the piezoelectric substrates $P_T$ and $P_R$.

According to another aspect of the present invention there is provided a display panel such that the phase velocity of the elastic wave in the display panel is higher than that in the nonpiezoelectric plate alone.

According to another aspect of the present invention there are provided two amplifiers $A_X$ and $A_Y$. An input terminal of the switch $C_i$ in the elastic wave transducing unit Y is connected with an output terminal of the interdigital transducer $I_R$ in the elastic wave transducing unit X via the amplifier $A_X$. An input terminal of the switch $C_i$ in the elastic wave transducing unit X is connected with an output terminal of the interdigital transducer $I_R$ in the elastic wave transducing unit Y via the amplifier $A_Y$. The switches $C_i$ in the elastic wave transducing unit X, the propagation lanes $U_{Xi}$ as delay elements, the amplifier $A_X$, the switches $C_i$ in the elastic wave transducing unit Y, the propagation lanes $U_{Yi}$ as delay elements, and the amplifier $A_Y$ form N oscillators $H_i$ (i=1, 2, . . . , N).

According to other aspect of the present invention there is provided an elastic wave position-sensing device comprising at least two elastic wave transducing units X and Y, a nonpiezoelectric plate, a display panel, and a controlling system connected with the two elastic wave transducing units X and Y and the display panel. Each elastic wave transducing unit consists of a piezoelectric substrate $P_T$ comprising N piezoelectric parts $P_{Ti}$ (i=1, 2, , . . . , N), a piezoelectric substrate $P_R$, N interdigital transducers $T_i$ (i=1, 2, . . . , N), an interdigital transducer R, N earth electrodes $G_{Ti}$ (i=1, 2, . . . , N), an earth electrode $G_R$, a phase shifter $S_T$ including at least a coil $L_1$, a phase shifter $S_R$ including at least a coil $L_2$, and N pairs of switches $W_i$ (i=1, 2, . . . , N). Each interdigital transducer $T_i$ formed on each piezoelectric part $P_{Ti}$ consists of two electrodes $T_{i-1}$ and $T_{i-2}$, and has two kinds of distances between one electrode finger of the electrode $T_{i-1}$ and two neighboring electrode fingers of the electrode $T_{i-2}$. The interdigital transducer R formed on one end surface of the piezoelectric substrate $P_R$ consists of two electrodes $R_{-1}$ and $R_{-2}$, and has two kinds of distances between one electrode finger of the electrode $R_{-1}$ and two neighboring electrode fingers of the electrode $R_{-2}$. Each pair of switches $W_i$ consists of two switches $W_{i-1}$ and $W_{i-2}$, output terminals of the switches $W_{i-1}$ and $W_{i-2}$ being connected with input terminals of the electrodes $T_{i-1}$ and $T_{i-2}$, respectively. The piezoelectric substrates $P_T$ and $P_R$ are mounted on one or the other end surface of the nonpiezoelectric plate through the earth electrodes $G_{Ti}$ and $G_R$, respectively.

The interdigital transducer $T_i$ and the earth electrode $G_{Ti}$ receive an electric signal $E_{T1}$ between the electrode $T_{i-1}$ and the earth electrode $G_{Ti}$, and an electric signal $E_{T2}$ between the electrode $T_{i-2}$ and the earth electrode $G_{Ti}$ via the phase shifter $S_T$, and excites an elastic wave of the $S_o$ mode and the higher order modes in the bilayer zone $L_{Ti}$. The elastic wave is transmitted to the bilayer zone $L_R$ through the monolayer zone, the phase difference between the electric signals $E_{T1}$ and $E_{T2}$ being $2\pi y$. In this time, $x<\frac{1}{2}$ in a shorter distance xp of the two kinds of distances between one electrode finger of the electrode $T_{i-1}$ and two neighboring electrode fingers of the electrode $T_{i-2}$, and $x+y=\pm\frac{1}{2}$ in the phase difference $2\pi y$ between the electric signals $E_{T1}$ and $E_{T2}$.

The interdigital transducer R and the earth electrode $G_R$ transduce the elastic wave in the bilayer zone $L_R$ to an electric signal $E_{R1}$ between the electrode $R_{-1}$ and the earth electrode $G_R$, and an electric signal $E_{R2}$ between the electrode $R_{-2}$ and the earth electrode $G_R$, the phase difference between the electric signals $E_{R1}$ and $E_{R2}$ being $2\pi y$. In this time, $x<\frac{1}{2}$ in a shorter distance xp of the two kinds of distances between one electrode finger of the electrode $R_{-1}$ and two neighboring electrode fingers of the electrode $R_{-2}$, and $x+y=\pm\frac{1}{2}$ in the phase difference $2\pi y$ between the electric signals $E_{R1}$ and $E_{R2}$. The phase shifter $S_R$ combines the electric signals $E_{R1}$ and $E_{R2}$, and delivers a combined electric signal $E_R$.

The controlling system turns on and off the pairs of switches $W_i$ with a fixed period in turn, keeps a check on a magnitude of the electric signal $E_R$, senses a touch with a finger or others under a fixed or more pressure on the other end surface of the nonpiezoelectric plate by a decrease or a disappearance in magnitude of the electric signal $E_R$, picks out the pair of switches $W_i$ turned on when the decrease or the disappearance in magnitude of the electric signal $E_R$ happens, specifies a touch-position corresponding with the picked out pair of switches $W_i$, and produces an image corresponding to the touch-position on the display panel.

According to a further aspect of the present invention there are provided two amplifiers $A_X$ and $A_Y$. An input terminal of the phase shifter $S_T$ in the elastic wave transducing unit Y is connected with an output terminal of the phase shifter $S_R$ in the elastic wave transducing unit X via the amplifier $A_X$. An input terminal of the phase shifter $S_T$ in the elastic wave transducing unit X is connected with an output terminal of the phase shifter $S_R$ in the elastic wave transducing unit Y via the amplifier $A_Y$. The phase shifter $S_T$ in the elastic wave transducing unit X, the pairs of switches $W_i$ in the elastic wave transducing unit X, the propagation lanes $U_{Xi}$ as delay elements, the phase shifter $S_R$ in the elastic wave transducing unit X, the amplifier $A_X$, the phase shifter $S_T$ in the elastic wave transducing unit Y, the pairs of switches $W_i$ in the elastic wave transducing unit Y, the propagation lanes $U_{Yi}$ as delay elements, the phase shifter $S_R$ in the elastic wave transducing unit Y, and the amplifier $A_Y$ form N oscillators $H_i$ (i=1, 2, . . . , N).

BRIEF DESCRIPTION OF THE DRAWINGS

Other features and advantages of the invention will be clarified from the following description with reference to the attached drawings.

DETAILED DESCRIPTION OF THE PRESENTLY PREFERRED EXEMPLARY EMBODIMENTS

Figure 1:
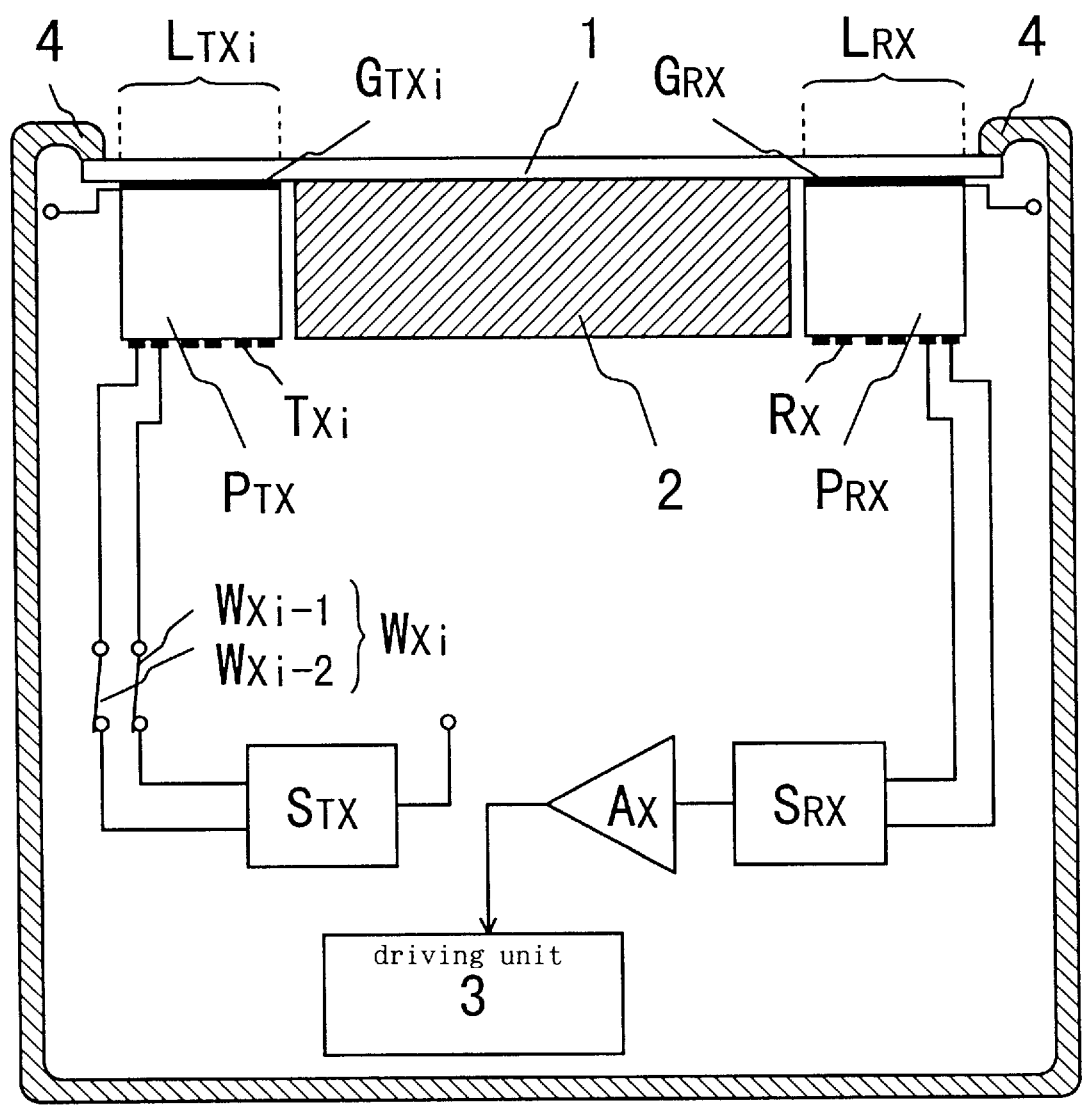
FIG. 1 shows a sectional view of the elastic wave position-sensing device according to a first embodiment of the present invention.

FIG. 1 shows a sectional view of an elastic wave position-sensing device according to a first embodiment of the present invention. The elastic wave position-sensing device comprises glass plate 1 with a dimension of 150 μm in thickness, display panel 2, driving unit 3, frame 4 and two elastic wave transducing units X and Y. Elastic wave transducing unit X comprises piezoelectric substrate $P_{TX}$ having two end surfaces running perpendicular to the thickness direction thereof, piezoelectric substrate $P_{RX}$ having two end surfaces running perpendicular to the thickness direction thereof, eight interdigital transducers $T_{Xi}$ (i=1, 2, . . . , 8) formed on one end surface of piezoelectric substrate $P_{TX}$, interdigital transducer $R_X$ formed on one end surface of piezoelectric substrate $P_{RX}$, eight earth electrodes $G_{TXi}$ (i=1, 2, . . . , 8) formed on the other end surface of piezoelectric substrate $P_{TX}$, earth electrode $G_{RX}$ formed on the other end surface of piezoelectric substrate $P_{RX}$, two phase shifters $S_{TX}$ and $S_{RX}$, amplifier $A_X$, and eight pairs of switches $W_{Xi}$ (i=1, 2, . . . , 8). Elastic wave transducing unit Y comprises piezoelectric substrate $P_{TY}$ having two end surfaces running perpendicular to the thickness direction thereof, piezoelectric substrate $P_{RY}$ having two end surfaces running perpendicular to the thickness direction thereof, eight interdigital transducers $T_{Yi}$ (i=1, 2, . . . , 8) formed on one end surface of piezoelectric substrate $P_{TY}$, interdigital transducer $R_Y$ formed on one end surface of piezoelectric substrate $P_{RY}$, eight earth electrodes $G_{TYi}$ (i=1, 2, . . . , 8) formed on the other end surface of piezoelectric substrate $P_{TY}$, earth electrode $G_{RY}$ formed on the other end surface of piezoelectric substrate $P_{RY}$, two phase shifters $S_{TY}$ and $S_{RY}$, amplifier $A_Y$, and eight pairs of switches $W_{Yi}$ (i=1, 2, . . . , 8). FIG. 1 shows only glass plate 1, display panel 2, driving unit 3, frame 4 and elastic wave transducing unit X. In FIG. 1, a connection of driving unit 3 with display panel 2 is not drawn. Each piezoelectric substrate, of which material is TDK-101A (Brand name), has a dimension of 1.5 mm in thickness. Interdigital transducers $T_{Xi}$, $R_X$, $T_{Yi}$ and $R_Y$, made from aluminium thin film, are mounted on piezoelectric substrates $P_{TX}$, $P_{RX}$, $P_{TY}$ and $P_{RY}$, respectively, which are cemented on the edge of one end surface of glass plate 1 through an epoxy resin with thickness of about 20 μm. Earth electrode $G_{TXi}$ corresponding to interdigital transducer $T_{Xi}$ is located between piezoelectric substrate $P_{TX}$ and glass plate 1. Earth electrode $G_{RX}$ corresponding to interdigital transducer $R_X$ is located between piezoelectric substrate $P_{RX}$ and glass plate 1. Earth electrode $G_{TYi}$ corresponding to interdigital transducer $T_{Yi}$ is located between piezoelectric substrate $P_{TY}$ and glass plate 1. Earth electrode $G_{RY}$ corresponding to interdigital transducer $R_Y$ is located between piezoelectric substrate $P_{RY}$ and glass plate 1. Display panel 2 is mounted on a central part of the end surface, with piezoelectric substrates $P_{TX}$, $P_{RX}$, $P_{TY}$ and $P_{RY}$, of glass plate 1. The edge of the other end surface, without piezoelectric substrates $P_{TX}$, $P_{RX}$, $P_{TY}$ and $P_{RY}$, of glass plate 1, is connected with frame 4 protecting the inside of the elastic wave position-sensing device from invader, for example, food and drink such as coffee, mayonnaise and so on, dropped on a central part of the other end surface of glass plate 1, the other end surface of glass plate 1 being called a touch face from now on. Piezoelectric substrate $P_{TX}$ is composed of eight piezoelectric parts $P_{TXi}$ (i=1, 2, . . . , 8) corresponding to eight interdigital transducers $T_{Xi}$, respectively. Piezoelectric substrate $P_{TY}$ is composed of eight piezoelectric parts $P_{TYi}$ (i=1, 2, . . . , 8) corresponding to eight interdigital transducers $T_{Yi}$, respectively. Glass plate 1 is composed of eight parts $1_{Xi}$ (i=1, 2, . . . , 8) adjacent to eight piezoelectric parts $P_{TXi}$, a part adjacent to piezoelectric substrate $P_{RX}$, eight parts $1_{Yi}$ (i=1, 2, . . . , 8) adjacent to eight piezoelectric parts $P_{TYi}$, a part adjacent to piezoelectric substrate $P_{RY}$, and the remaining part adjacent to display panel 2. Piezoelectric parts $P_{TXi}$ and the parts $1_{Xi}$ form eight bilayer zones $L_{TXi}$ (i=1, 2, . . . , 8). Piezoelectric substrate $P_{RX}$ and the part, of glass plate 1, adjacent to piezoelectric substrate $P_{RX}$ form a bilayer zone $L_{RX}$. Piezoelectric parts $P_{TYi}$ and the parts $1_{Yi}$ form eight bilayer zones $L_{TYi}$ (i=1, 2, . . . , 8). Piezoelectric substrate $P_{RY}$ and the part, of glass plate 1, adjacent to piezoelectric substrate $P_{RY}$ form a bilayer zone $L_{RY}$. The remaining part, of glass plate 1, adjacent to display panel 2 forms a monolayer zone.

Figure 2:
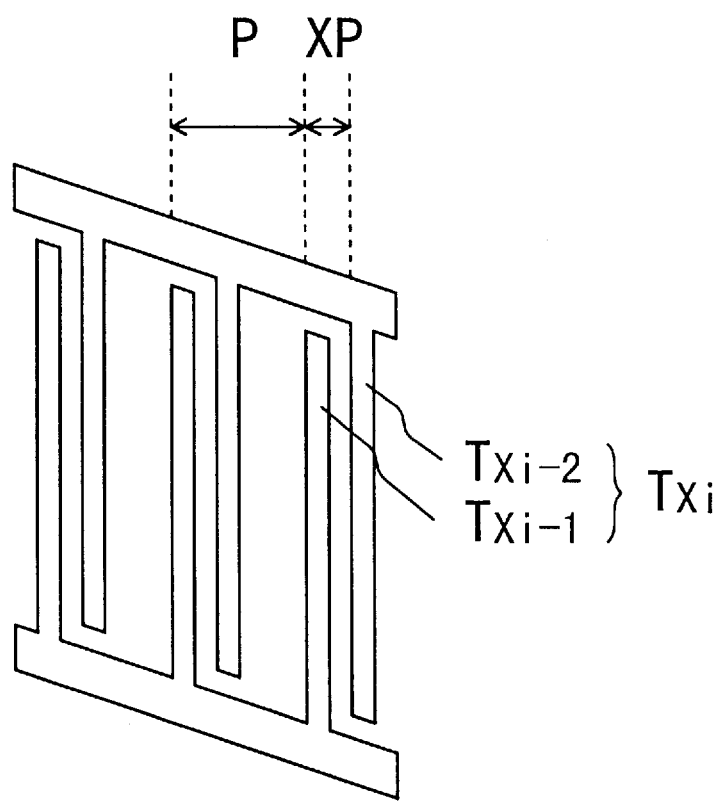
FIG. 2 shows a plan view of interdigital transducer $T_{Xi}$.

FIG. 2 shows a plan view of interdigital transducer $T_{Xi}$ comprising two electrodes $T_{Xi-1}$ and $T_{Xi-2}$. Interdigital transducer $T_{Yi}$, comprising two electrodes $T_{Yi-1}$ and $T_{Yi-2}$, has the same parallelogram-type construction as interdigital transducer $T_{Xi}$, consisting of ten finger pairs and having an interdigital periodicity p of 1.6 mm. Interdigital transducer $R_X$, comprising two electrodes $R_{X-1}$ and $R_{X-2}$, and interdigital transducer $R_Y$, comprising two electrodes $R_{Y-1}$ and $R_{Y-2}$, have the same parallelogram-type construction as interdigital transducer $T_{Xi}$, with the exception in length of electrode finger. Each interdigital transducer has two kinds of distances between one electrode finger and two neighboring electrode fingers, the shorter distance xp being 400 μm.

Figure 3:
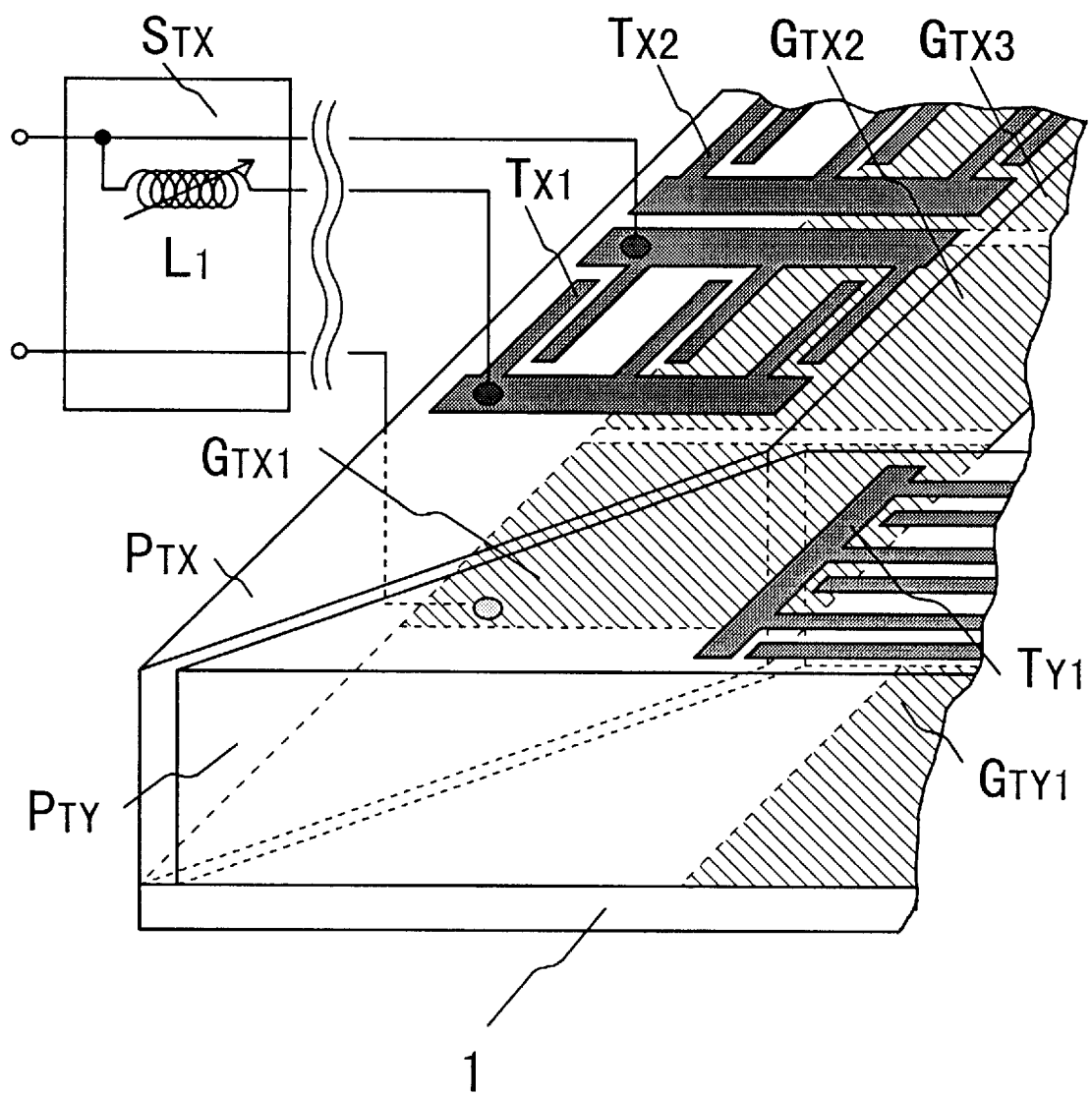
FIG. 3 shows a fragmentary perspective view of the elastic wave position-sensing device in FIG. 1.

FIG. 3 shows a fragmentary perspective view of the elastic wave position-sensing device in FIG. 1. Interdigital transducer $T_{Xi}$ and earth electrode $G_{TXi}$ are connected with phase shifter $S_{TX}$ including a coil $L_1$, via a pair of switches $W_{Xi}$. For example, interdigital transducer $T_{X1}$ and earth electrode $G_{TX1}$ are connected with phase shifter $S_{TX}$ via a pair of switches $W_{X1}$, which is not drawn in FIG. 3. Interdigital transducer $T_{Yi}$ and earth electrode $G_{TYi}$ are connected with phase shifter $S_{TY}$ including a coil $L_1$, via a pair of switches $W_{Yi}$. Interdigital transducer $R_X$ and earth electrode $G_{RX}$ are connected with phase shifter $S_{RX}$ including a coil $L_2$. Interdigital transducer $R_Y$ and earth electrode $G_{RY}$ are connected with phase shifter $S_{RY}$ including a coil $L_2$.

Figure 4:
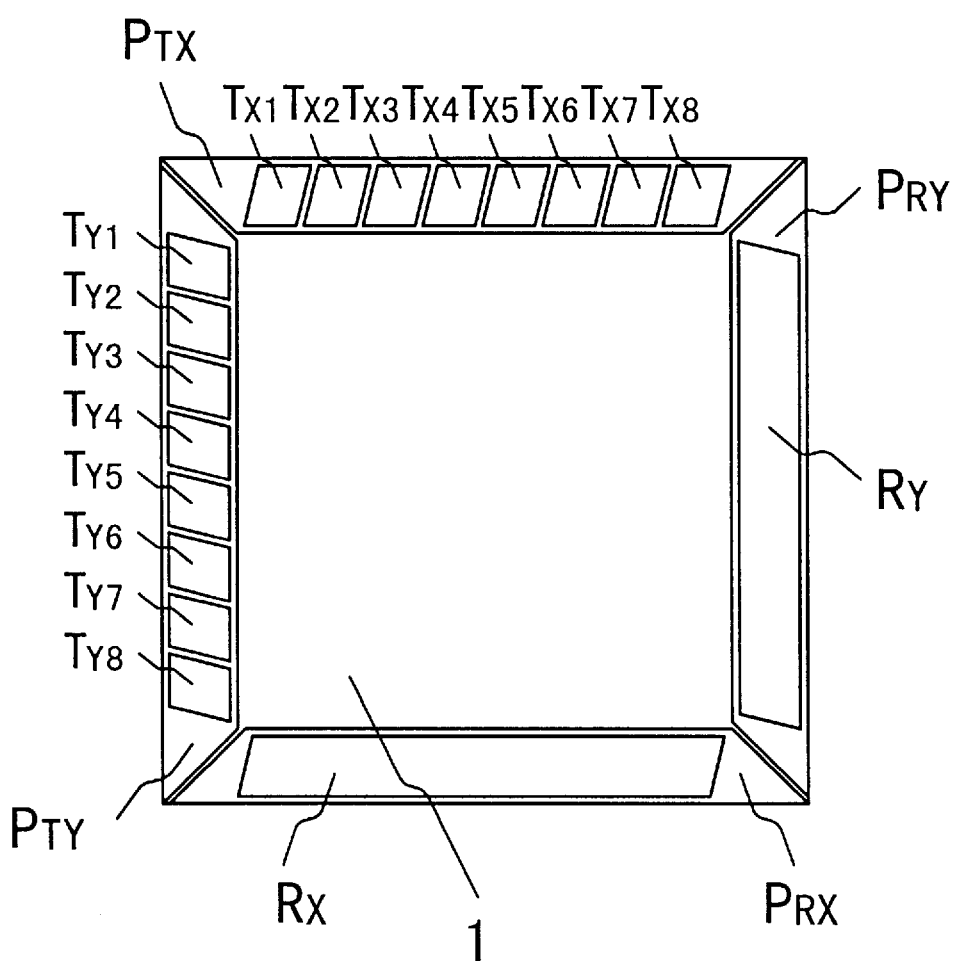
FIG. 4 shows a plan view of glass plate 1 with piezoelectric substrates $P_{TX}$, $P_{RX}$, $P_{TY}$ and $P_{RY}$, on which interdigital transducers $T_{Xi}$, $R_X$, $T_{Yi}$ and $R_Y$ are mounted.

FIG. 4 shows a plan view of glass plate 1 with piezoelectric substrates $P_{TX}$, $P_{RX}$, $P_{TY}$ and $P_{RY}$, on which interigital transducers $T_{Xi}$, $R_X$, $T_{Yi}$ and $R_Y$ are mounted.

Figure 5:
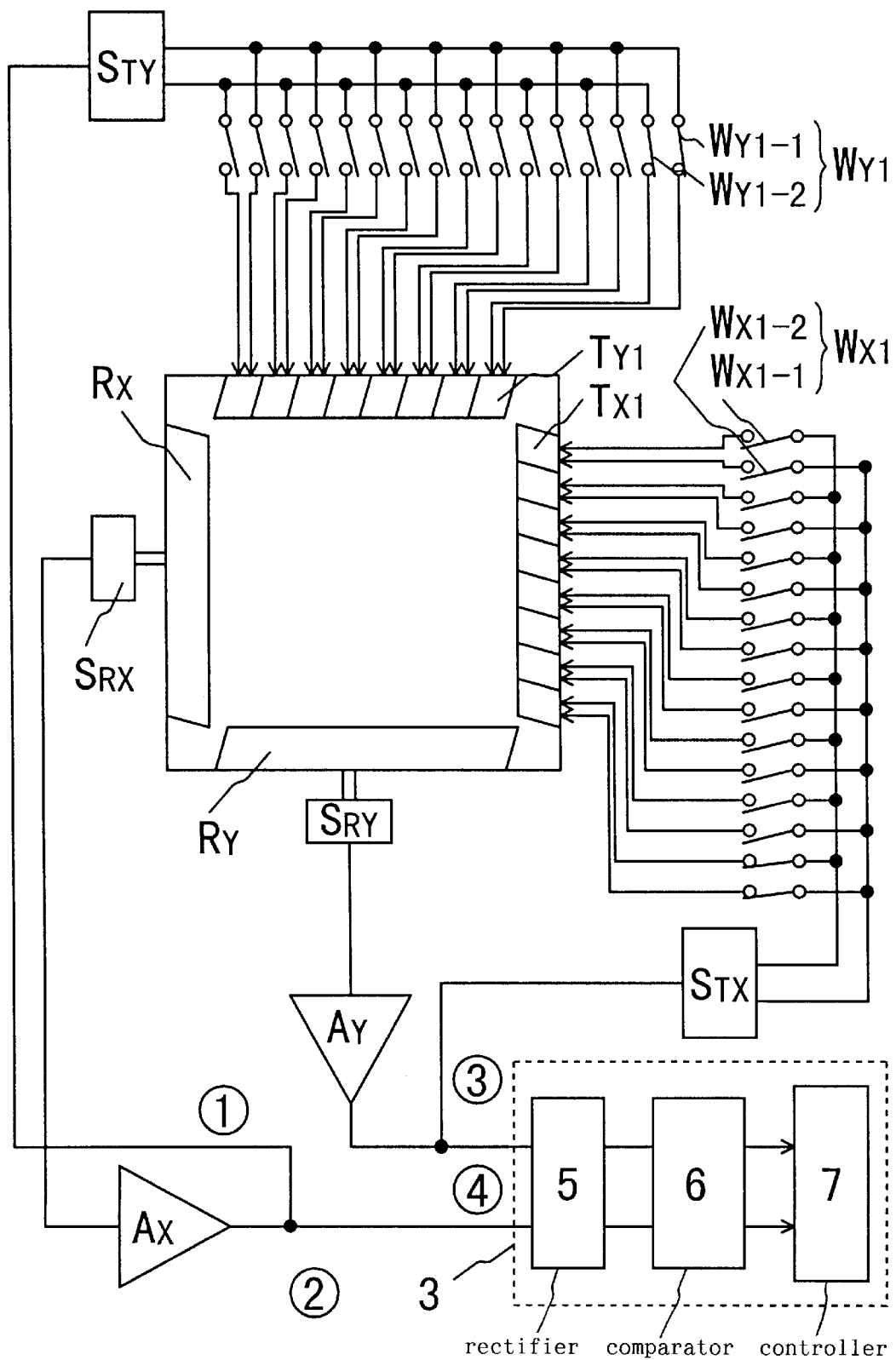
FIG. 5 shows a diagram of a driving circuit of the elastic wave position-sensing device in FIG. 1.

FIG. 5 shows a diagram of a driving circuit of the elastic wave position-sensing device in FIG. 1. Driving unit 3 comprises rectifier 5, comparator 6 and controlling system 7. A pair of switches $W_{Xi}$ comprises two switches $W_{Xi-1}$ and $W_{Xi-2}$, output terminals of switches $W_{Xi-1}$ and $W_{Xi-2}$ being connected with input terminals of electrodes $T_{Xi-1}$ and $T_{Xi-2}$, respectively. A pair of switches $W_{Yi}$ comprises two switches $W_{Yi-1}$ and $W_{Yi-2}$, output terminals of switches $W_{Yi-1}$ and $W_{Yi-2}$ being connected with input terminals of electrodes $T_{Yi-1}$ and $T_{Yi-2}$, respectively. In FIG. 5, connections of controlling system 7 with eight pairs of switches $W_{Xi}$ and eight pairs of switches $W_{Yi}$ are not drawn.

When operating the elastic wave position-sensing device in FIG. 1, an electric signal $E_T$ having a frequency approximately corresponding to the interdigital periodicity p of interdigital transducer $T_{Xi}$ is divided into two electric signals $E_{T1}$ and $E_{T2}$, with the phase difference $2\pi y$, by phase shifter $S_{TX}$, and then, the electric signals $E_{T1}$ and $E_{T2}$ are applied between electrode $T_{Xi-1}$ and earth electrode $G_{TXi}$, and between electrode $T_{Xi-2}$ and earth electrode $G_{TXi}$, respectively, via switches $W_{Xi-1}$ and $W_{Xi-2}$. In this time, if $x<\frac{1}{2}$ in the shorter distance xp with respect to interdigital transducer $T_{Xi}$ in FIG. 2, and moreover, $x+y=\pm\frac{1}{2}$ in the phase difference $2\pi y$ between the electric signals $E_{T1}$ and $E_{T2}$, the unidirectional elastic wave, of the $S_o$ mode and the higher order modes having the wavelength approximately equal to the interdigital periodicity p of interdigital transducer $T_{Xi}$, is excited in the bilayer zone $L_{TXi}$. For example, if $x=\frac{1}{4}$, $y=\frac{1}{4}$ or $y=-\frac{3}{4}$. Thus, when $xp=400 \mu m$ with respect to interdigital transducer $T_{Xi}$ as shown in FIG. 2, and moreover, $2\pi y=\pi/2$ (90°) or $2\pi y=-3\pi/2(-270°)$, the unidirectional elastic wave is excited in the bilayer zone $L_{TXi}$. The excitation of the unidirectional elastic wave generates no reflection of an elastic wave at the side surface, being in contact with air, of the bilayer zone $L_{TXi}$, so that seldom or never makes a noise. In addition, the excitation of the unidirectional elastic wave reduces a waste of an electric energy applied to interdigital transducer $T_{Xi}$, causing the elastic wave position-sensing device in FIG. 1 to be operated under low power consumption with low voltage.

If the phase velocity of the unidirectional elastic wave excited in the bilayer zone $L_{TXi}$ is approximately equal to the phase velocity $V_{fd=0}$, of the $S_o$ mode elastic wave, corresponding to a condition that the product FD of the frequency F of the unidirectional elastic wave excited in the bilayer zone $L_{TXi}$ and the thickness D of piezoelectric substrate $P_{TX}$ is zero, the transducing efficiency from the electric signal $E_T$ to the unidirectional elastic wave increases, and in addition, the reflection caused by the miss-matching on the acoustic impedance at the boundary surface between glass plate 1 and piezoelectric substrate $P_{TX}$ never causes.

If the thickness D of piezoelectric substrate $P_{TX}$ is approximately equal to or smaller than the interdigital periodicity p of interdigital transducer $T_{Xi}$, and if the thickness of glass plate 1 is equal to or smaller than the thickness D of piezoelectric substrate $P_{TX}$, the unidirectional elastic wave of the $S_o$ mode and the higher order modes is excited in the bilayer zone $L_{TXi}$ effectively, and the transducing efficiency from the electric signal $E_T$ to the unidirectional elastic wave increases.

If using a piezoelectric ceramic having the polarization axis parallel to the thickness direction thereof, as piezoelectric substrate $P_{TX}$, the unidirectional elastic wave of the $S_o$ mode and the higher order modes is excited in the bilayer zone $L_{TXi}$ effectively, and the transducing efficiency from the electric signal $E_T$ to the unidirectional elastic wave increases.

If using a piezoelectric polymer such as PVDF and so on, as piezoelectric substrate $P_{TX}$, the unidirectional elastic wave of the $S_o$ mode and the higher order modes is excited in the bilayer zone $L_{TXi}$ effectively, and the transducing efficiency from the electric signal $E_T$ to the unidirectional elastic wave increases.

If using a glass, as glass plate 1, such that the phase velocity of the elastic wave in glass plate 1 alone is approximately equal to that in piezoelectric substrate $P_{TX}$ alone, the unidirectional elastic wave of the $S_o$ mode and the higher order modes is excited in the bilayer zone $L_{TXi}$ effectively, and the transducing efficiency from the electric signal $E_T$ to the unidirectional elastic wave increases.

The unidirectional elastic wave in the bilayer zone $L_{TXi}$ is transmitted to the monolayer zone. If using a material, as display panel 2, such that the phase velocity of the elastic wave in display panel 2 is higher than that in glass plate 1 alone, the unidirectional elastic wave in the monolayer zone is not leaked in display panel 2.

The unidirectional elastic wave in the monolayer zone is transmitted to the bilayer zone $L_{RX}$. Interdigital transducer $R_X$ is located so that the elastic wave transmitting direction from interdigital transducer $T_{Xi}$ and the elastic wave receiving direction at interdigital transducer $R_X$ overlap each other, as shown in FIG. 4. Accordingly, if $x<\frac{1}{2}$ in the shorter distance xp with respect to interdigital transduce $R_X$ in FIG. 2, the unidirectional elastic wave, in the bilayer zone $L_{RX}$, having the wavelength approximately equal to the interdigital periodicity p of interdigital transducer $R_X$, is transduced to an electric signal $E_{R1}$ between electrode $R_{X-1}$ and earth electrode $G_{RX}$, and an electric signal $E_{R2}$ between electrode $R_{X-2}$ and earth electrode $G_{RX}$. In this time, $x+y=\pm\frac{1}{2}$ in the phase difference $2\pi y$ between the electric signals $E_{R1}$ and $E_{R2}$. For example, if $x=\frac{1}{4}$, $y=\frac{1}{4}$ or $y=-\frac{3}{4}$. Thus, when $xp=400 \mu m$ with respect to interdigital transduce $R_X$ as shown in FIG. 2, the electric signals $E_{R1}$, and $E_{R2}$, where $2\pi y=\pi/2(90°)$ or $2\pi y=-3\pi/2(-270°)$, are delivered between electrode $R_{X-1}$ and earth electrode $G_{RX}$, and between electrode $R_{X-2}$ and earth electrode $G_{RX}$, respectively. Each of the electric signals $E_{R1}$ and $E_{R2}$ has a frequency approximately corresponding to the interdigital periodicity p of interdigital transducer $R_X$.

If the phase velocity of the unidirectional elastic wave in the bilayer zone $L_{RX}$ is approximately equal to the phase velocity $V_{fd=0}$, of the $S_o$ mode elastic wave, corresponding to a condition that the product FD of the frequency F of the unidirectional elastic wave transmitted to the bilayer zone $L_{RX}$ and the thickness D of piezoelectric substrate $P_{RX}$ is zero, the transducing efficiency from the unidirectional elastic wave to the electric signals $E_{R1}$ and $E_{R2}$ increases, and in addition, the reflection caused by the miss-matching on the acoustic impedance at the boundary surface between glass plate 1 and piezoelectric substrate $P_{RX}$ never causes.

If the thickness D of piezoelectric substrate $P_{RX}$ is approximately equal to or smaller than the interdigital periodicity p of interdigital transducer $R_X$, and if the thickness of glass plate 1 is equal to or smaller than the thickness D of piezoelectric substrate $P_{RX}$, the unidirectional elastic wave in the monolayer zone is transmitted to the bilayer zone $L_{RX}$ effectively, and the transducing efficiency from the unidirectional elastic wave to the electric signals $E_{R1}$ and $E_{R2}$ increases.

If using a piezoelectric ceramic having the polarization axis parallel to the thickness direction thereof, as piezoelectric substrate $P_{RX}$, the unidirectional elastic wave in the monolayer zone is transmitted to the bilayer zone $L_{RX}$ effectively, and the transducing efficiency from the unidirectional elastic wave to the electric signals $E_{R1}$ and $E_{R2}$ increases.

If using a piezoelectric polymer such as PVDF and so on, as piezoelectric substrate $P_{RX}$, the unidirectional elastic wave in the monolayer zone is transmitted to the bilayer zone $L_{RX}$ effectively, and the transducing efficiency from the unidirectional elastic wave to the electric signals $E_{R1}$ and $E_{R2}$ increases.

If using a glass, as glass plate 1, such that the phase velocity of the elastic wave in glass plate 1 alone is approximately equal to that in piezoelectric substrate $P_{RX}$ alone, the unidirectional elastic wave in the monolayer zone is transmitted to the bilayer zone $L_{RX}$ effectively, and the transducing efficiency from the unidirectional elastic wave to the electric signals $E_{R1}$ and $E_{R2}$ increases.

The electric signals $E_{R1}$ and $E_{R2}$ are combined and detected as an electric signal $E_R$ at phase shifter $S_{RX}$. The electric signal $E_R$ is amplified via amplifier $A_X$. An electric signal ①, which is a part of the amplified electric signal via amplifier $A_X$ and is corresponding to the electric signal $E_T$, is divided into two electric signals $E_{T1}$ and $E_{T2}$ by phase shifter $S_{TY}$. The electric signals $E_{T1}$ and $E_{T2}$ are applied between electrode $T_{Yi-1}$ and earth electrode $G_{TYi}$, and between electrode $T_{Yi-2}$ and earth electrode $G_{TYi}$, respectively, via switches $W_{Yi-1}$ and $W_{Yi-2}$. An electric signal ②, which is the remaining part of the amplified electric signal via amplifier $A_X$, is transmitted to controlling system 7 via rectifier 5 and comparator 6. Elastic wave transducing unit Y is equivalent to elastic wave transducing unit X. Thus, when the electric signals $E_{T1}$ and $E_{T2}$ are applied between electrode $T_{Yi-1}$ and earth electrode $G_{TYi}$, and between electrode $T_{Yi-2}$ and earth electrode $G_{TYi}$, respectively, the unidirectional elastic wave, of the $S_o$ mode and the higher order modes having the wavelength approximately equal to the interdigital periodicity p of interdigital transducer $T_{Yi}$, is excited in the bilayer zone $L_{TYi}$. The elastic wave is transmitted to the monolayer zone. The elastic wave in the monolayer zone is transmitted to the bilayer zone $L_{RY}$. The elastic wave, in the bilayer zone $L_{RY}$, having the wavelength approximately equal to the interdigital periodicity p of interdigital transducer $R_Y$, is transduced to an electric signal $E_{R1}$ between electrode $R_{Y-1}$ and earth electrode $G_{RY}$, and an electric signal $E_{R2}$ between electrode $R_{Y-2}$ and earth electrode $G_{RY}$. The electric signals $E_{R1}$ and $E_{R2}$ are combined and detected as an electric signal $E_R$ at phase shifter $S_{RY}$. The electric signal $E_R$ is amplified via amplifier $A_Y$. An electric signal ③, which is a part of the amplified electric signal via amplifier $A_Y$, is transmitted to phase shifter $S_{TX}$, and an electric signal ④, which is the remaining part of the amplified electric signal via amplifier $A_Y$, is transmitted to controlling system 7 via rectifier 5 and comparator 6.

Controlling system 7 plays five roles. The first role is to turn on and off eight pairs of switches $W_{Xi}$ with a fixed period in turn, and eight pairs of switches $W_{Yi}$ with a fixed period in turn, eight pairs of switches $W_{Xi}$ being closed in turn while a pair of switches $W_{Yi}$ is closed. In this time, switches $W_{Xi-1}$ and $W_{Xi-2}$ are in the same condition each other, and switches $W_{Yi-1}$ and $W_{Yi-2}$ are in the same condition each other. The second role is to keep a check on a magnitude of the electric signal $E_R$. The third role is to sense a touch with a finger or others under a fixed or more pressure on the touch face by a decrease or a disappearance in magnitude of the electric signal $E_R$. The fourth role is to pick out the pair of switches $W_{Xi}$ closed when a decrease or a disappearance in magnitude of the electric signal $E_R$ at phase shifter $S_R$ X happens, and the pair of switches $W_{Yi}$ closed when a decrease or a disappearance in magnitude of the electric signal $E_R$ at phase shifter $S_{RY}$ happens, and then specifying a touch-position, corresponding with the picked out pairs of switches $W_{Xi}$ and $W_{Yi}$, on the touch face. The last role is to produce an image corresponding to the touch-position on display panel 2.

Because the elastic wave travels the inside of the monolayer zone instead of the surface thereof, both the surfaces thereof can be used for touching with a finger or others, or for having display panel 2 installed, besides, the elastic wave is not intercepted by touching with a finger or others under only a little pressure on the surface thereof. Accordingly, the elastic wave position-sensing device in FIG. 1 is not affected by, for example, only a light touch with a finger or others on the touch face, food and drink such as coffee or mayonnaise dropped on the touch face, and so on. Therefore, it is possible to provide the elastic wave position-sensing device sensing a touch with a finger or others only under a fixed or more pressure on the touch face.

Elastic wave transducing unit X has eight propagation lanes $U_{Xi}$ (i=1, 2, . . . , 8) of the elastic wave in the monolayer zone between the bilayer zone $L_{TXi}$ and the bilayer zone $L_{RX}$. Elastic wave transducing unit Y has eight propagation lanes $U_{Yi}$ (i=1, 2, . . . , 8) of the elastic wave in the monolayer zone between the bilayer zone $L_{TYi}$ and the bilayer zone $L_{RY}$, the propagation lane $U_{Xi}$ being vertical to the propagation lane $U_{Yi}$. If touching a crossing point of propagation lanes $U_{Xi}$ and $U_{Yi}$ under a fixed or more pressure on the touch face with a pen, the elastic wave is intercepted at the crossing point. Therefore, the magnitude of the electric signal $E_R$ at phase shifter $S_{RX}$ and the magnitude of the electric signal $E_R$ at phase shifter $S_{RY}$ are decreased or disappeared. Thus, it is possible to sense a touch with the pen on the touch face, moreover, to specify a touch-position corresponding to the crossing point with a high sensitivity and a quick response time. If touching, for example, a crossing point of propagation lanes $U_{X3}$ and $U_{Y5}$, a decrease or a disappearance in magnitude of the electric signal $E_R$ at phase shifter $S_{RX}$ happens only when the pair of switches $W_{Y3}$ is closed, and a decrease or a disappearance in magnitude of the electric signal $E_R$ at phase shifter $S_{RY}$ happens only when the pair of switches $WY_5$ is closed. Thus, it is possible to specify a touch-position on the touch face by picking out a pair of switches $W_{Xi}$ closed when a decrease or a disappearance in magnitude of the electric signal $E_R$ at phase shifter $S_{RX}$ happens, and a pair of switches $W_{Yi}$ closed when a decrease or a disappearance in magnitude of the electric signal $E_R$ at phase shifter $S_{RY}$ happens. An image corresponding to the touch-position is produced on display panel 2.

Each interdigital transducer has the parallelogram-type construction as shown in FIG. 2. Besides, interdigital transducers $T_{Xi}$ are arranged as they stand in a line, as shown in FIG. 4, and interdigital transducers T are similar to interdigital transducers $T_{Xi}$. Therefore, two neighbors of propagation lanes $U_{Xi}$ are closed, and two neighbors of propagation lanes $U_{Yi}$ are also closed, so that there is no gap between two neighbors of propagation lanes $U_{Xi}$, and between two neighbors of propagation lanes $U_{Yi}$. Thus, all the touch face is of practical use, in other words, a response to a touch on the touch face is obtained without fail. As a result, it is possible to specify a touch-position on the touch face with precision. In addition, in case that two neighbors of propagation lanes $U_{Xi}$ are partially overlapping each other, the two neighbors of propagation lanes $U_{Xi}$ are specified if touching an overlapping area of the two neighbors of propagation lanes $U_{Xi}$ on the touch face. Accordingly, it becomes clear that the touch-position on the touch face is located between the two neighbors of propagation lanes $U_{Xi}$. Regarding two neighbors of propagation lanes $U_{Yi}$ partially overlapping each other, the touch-position is specified in the same way.

Input terminal of phase shifter $S_{TY}$ is connected with output terminal of phase shifter $S_{RX}$ via amplifier $A_X$, on the other hand, input terminal of phase shifter $S_{TX}$ is connected with output terminal of phase shifter $S_{RY}$ via amplifier $A_Y$. As a result, phase shifter $S_{TX}$, pairs of switches $W_{Xi}$, propagation lanes $U_{Xi}$ as delay elements, phase shifter $S_{RX}$, amplifier $A_X$, phase shifter $S_{TY}$, pairs of switches $W_{Yi}$, propagation lanes $U_{Yi}$ as delay elements, phase shifter $S_{RY}$, and amplifier $A_Y$ form eight oscillators $H_i$ (i=1, 2, . . . , 8). Oscillator $H_i$ enables the elastic wave position-sensing device in FIG. 1 to have a small-sized circuit with a simple structure. The small-sized circuit causes the elastic wave position-sensing device to have a small size which is very light in weight, and to be operated under low power consumption with low voltage.

Figure 6:
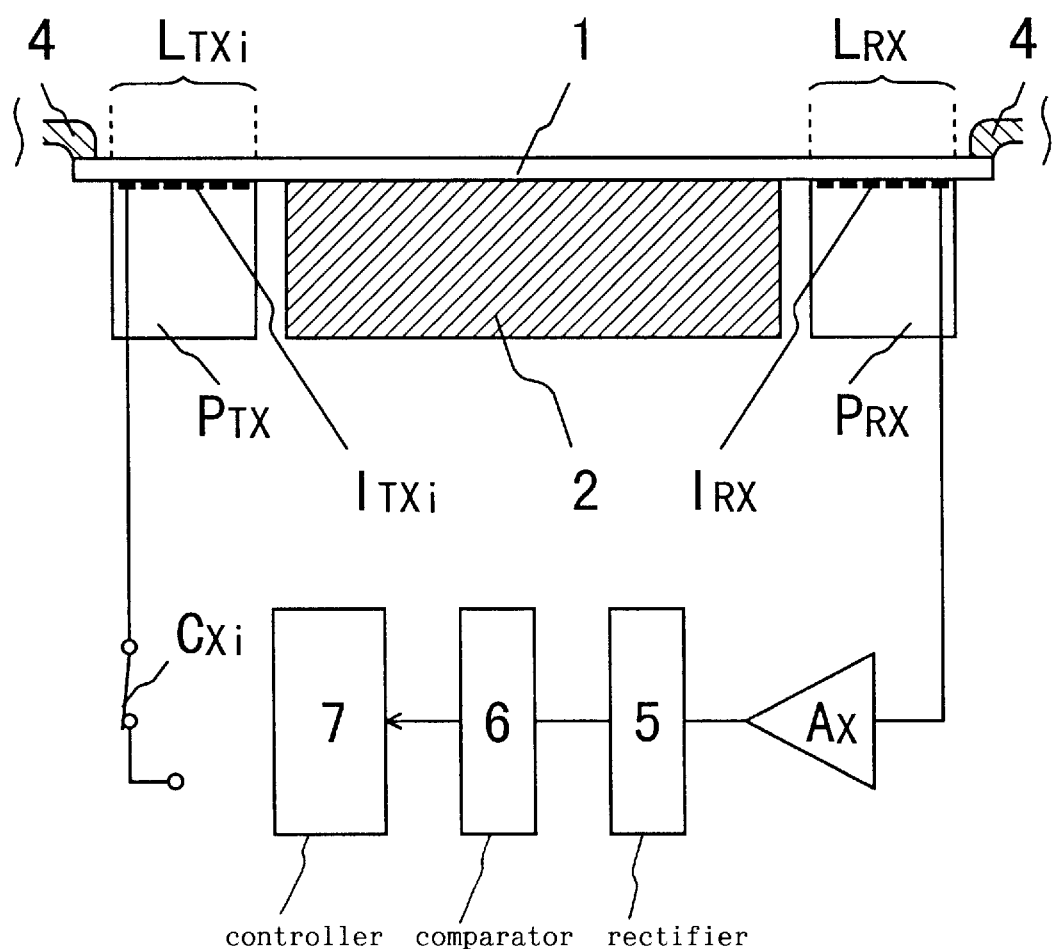
FIG. 6 shows a sectional view of an elastic wave position-sensing device according to a second embodiment of the present invention.

FIG. 6 shows a sectional view of an elastic wave position-sensing device according to a second embodiment of the present invention. The elastic wave position-sensing device in FIG. 6 has the same construction as the elastic wave position-sensing device in FIG. 1, excepting elastic wave transducing units X and Y. Elastic wave transducing unit X in FIG. 6 comprises piezoelectric substrate $P_{TX}$, piezoelectric substrate $P_{RX}$, eight interdigital transducers $I_{TXi}$ (i=1, 2, . . . 8) formed on one end surface of piezoelectric substrate $P_{TX}$, interdigital transducer $I_{RX}$ formed on one end surface of piezoelectric substrate $P_{RX}$, amplifier $A_X$, and eight switches $C_{Xi}$ (i=1, 2, . . . , 8). Elastic wave transducing unit Y in FIG. 6 comprises piezoelectric substrate $P_{TY}$, piezoelectric substrate $P_{RY}$ eight interdigital transducers $I_{TYi}$ (i=1, 2, . . . , 8) formed on one end surface of piezoelectric substrate $P_{TY}$, interdigital transducer $I_{RY}$ formed on one end surface of piezoelectric substrate $P_{RY}$, amplifier $A_Y$, and eight switches $C_{Yi}$ (i=1, 2, . . . , 8). FIG. 6 shows only glass plate 1, display panel 2, driving unit 3 comprising rectifier 5, comparator 6 and controlling system 7, frame 4 and elastic wave transducing unit X. In FIG. 6, a connection of driving unit 3 with display panel 2 is not drawn. Interdigital transducers $I_{TXi}$, $I_{RX}$, $I_{TYi}$ and $I_{RY}$, made from aluminium thin film, are mounted on piezoelectric substrates $P_{TX}$, $P_{RX}$, $P_{TY}$ and $P_{RY}$, respectively, which are cemented on the edge of one end surface of acryl plate 1 through an epoxy resin with thickness of about 20 $\mu$m.

Figure 7:
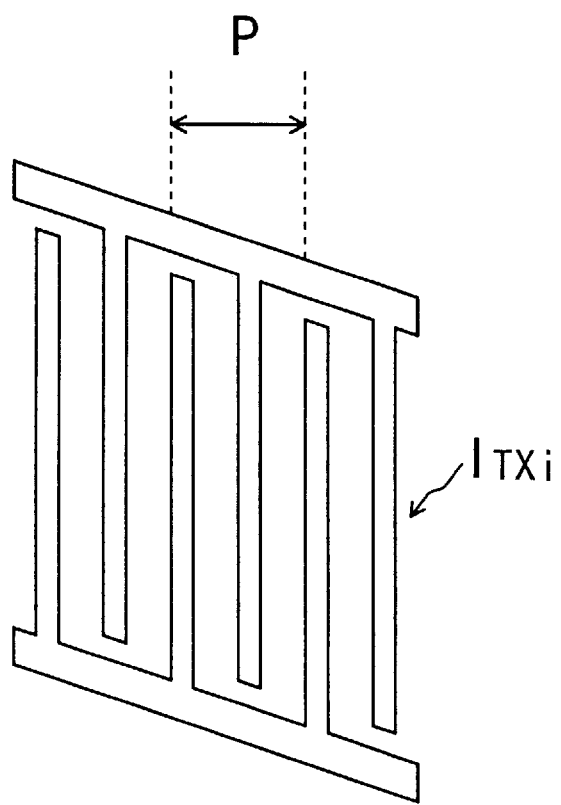
FIG. 7 shows a plan view of interdigital transducer $I_{TXi}$.

FIG. 7 shows a plan view of interdigital transducer $I_{TXi}$. Interdigital transducers $I_{TXi}$ and $I_{TYi}$ have the same construction each other. Interdigital transducers $I_{RX}$ and $I_{RY}$ have the same construction as interdigital transducers $I_{TXi}$ with the exception in length of electrode finger. Interdigital transducer $I_{TXi}$ has a parallelogram-type construction consisting of ten finger pairs and having an interdigital periodicity p of 1.6 mm. Interdigital transducer $I_{TXi}$ has the same construction as interdigital transducer $T_{Xi}$ in FIG. 2, except that interdigital transducer $T_{Xi}$ has two kinds of distances between one electrode finger and two neighboring electrode fingers. Interdigital transducer $I_{TXi}$ has an equal distance between two electrode fingers. Output terminals of switches $C_{Xi}$ and $C_{Yi}$ are connected with input terminals of interdigital transducers $I_{TXi}$ and $I_{TYi}$, respectively.

Figure 8:
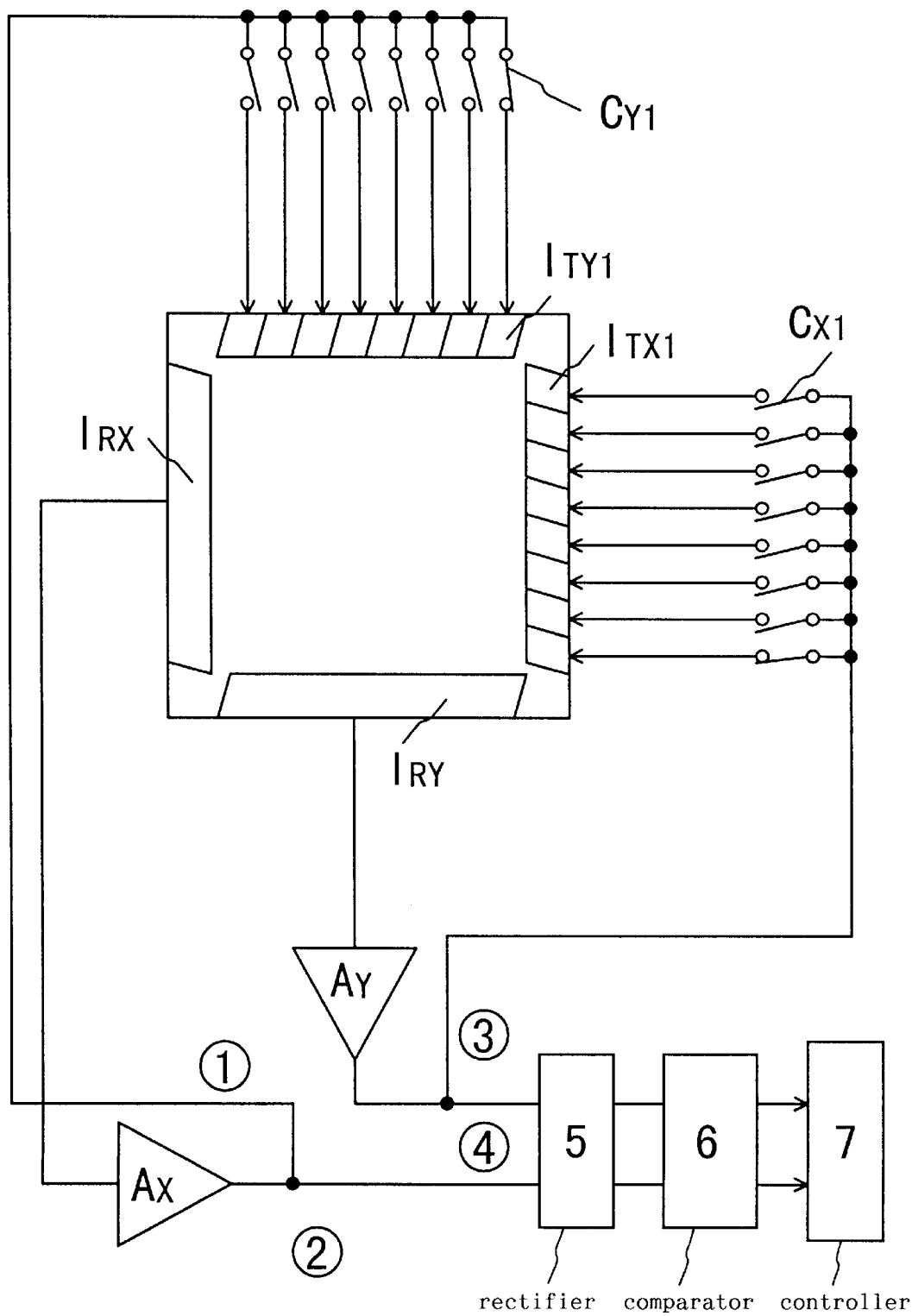
FIG. 8 shows a diagram of a driving circuit of the elastic wave position-sensing device in FIG. 6.

FIG. 8 shows a diagram of a driving circuit of the elastic wave position-sensing device in FIG. 6. In FIG. 8, connections of controlling system 7 with switches $C_{Xi}$ and $C_{Yi}$ are not drawn.

When operating the elastic wave position-sensing device in FIG. 6, an electric signal $E_T$ having a frequency approximately corresponding to the interdigital periodicity p of interdigital transducer $I_{TXi}$ is applied to interdigital transducer $I_{TXi}$ via switches $C_{Xi}$. In this time, the elastic wave, of the $S_o$ mode and the higher order modes having the wavelength approximately equal to the interdigital periodicity p of interdigital transducer $I_{TXi}$, is excited in the bilayer zone $L_{TXi}$. The elastic wave in the bilayer zone $L_{TXi}$ is transmitted to the bilayer zone $L_{RX}$ through the monolayer zone. The elastic wave in the bilayer zone $L_{RX}$ having the wavelength approximately equal to the interdigital periodicity p of interdigital transducer $I_{RX}$ is transduced to an electric signal $E_R$ with a frequency approximately corresponding to the interdigital periodicity p of interdigital transducer $I_{RX}$, at interdigital transducer $I_{RX}$. The electric signal $E_R$ is amplified via amplifier $A_X$. An electric signal ①, which is a part of the amplified electric signal via amplifier $A_X$ and is corresponding to the electric signal $E_T$, is applied to interdigital transducer $I_{TYi}$ via switches $C_{Yi}$. An electric signal ②, which is the remaining part of the amplified electric signal via amplifier $A_X$, is transmitted to controlling system 7 via rectifier 5 and comparator 6. Elastic wave transducing unit Y is equivalent to elastic wave transducing unit X. Thus, when the electric signal $E_T$ is applied to interdigital transducer $I_{TYi}$, the elastic wave, of the $S_o$ mode and the higher order modes having the wavelength approximately equal to the interdigital periodicity p of interdigital transducer $I_{TYi}$, is excited in the bilayer zone $L_{TYi}$. The elastic wave in the bilayer zone $L_{TYi}$ is transmitted to the bilayer zone $L_{RY}$ through the monolayer zone. The elastic wave in the bilayer zone $L_{RY}$ having the wavelength approximately equal to the interdigital periodicity p of interdigital transducer $I_{RY}$ is transduced to an electric signal $E_R$ with a frequency approximately corresponding to the interdigital periodicity p of interdigital transducer $I_{RY}$, at interdigital transducer $I_{RY}$. The electric signal $E_R$ is amplified via amplifier $A_Y$. An electric signal ③, which is a part of the amplified electric signal via amplifier $A_Y$ is applied to interdigital transducer $I_{TXi}$ via switches $C_{Xi}$. An electric signal ④, which is the remaining part of the amplified electric signal via amplifier $A_Y$, is transmitted to controlling system 7 via rectifier 5 and comparator 6.

In the elastic wave position-sensing device in FIG. 6, the first role of controlling system 7 is to turn on and off switches $C_{Xi}$ and $C_{Yi}$ with a fixed period in turn, switches $C_{Xi}$ being closed in turn while one of switches $C_{Yi}$ is closed. The second role is to keep a check on a magnitude of the electric signal $E_R$. The third role is to sense a touch with a finger or others under a fixed or more pressure on the touch face by a decrease or a disappearance in magnitude of the electric signal $E_R$. The fourth role is to pick out the switch $C_{Xi}$ closed when a decrease or a disappearance in magnitude of the electric signal $E_R$ happens, and the switch $C_{Yi}$ closed when a decrease or a disappearance in magnitude of the electric signal $E_R$ happens, and then specifying a touch-position, corresponding with the picked out switches $C_{Xi}$ and $C_{Yi}$, on the touch face. The last role is to produce an image corresponding to the touch-position on display panel 2. Thus, it is possible to specify a touch-position on the touch face, and moreover, an image corresponding to the touch-position is produced on display panel 2. Input terminal of switch $C_{Xi}$ is connected with output terminal of interdigital transducer $I_{RY}$ via amplifier $A_Y$, and input terminal of switch $C_{Yi}$ is connected with output terminal of interdigital transducer $I_{RX}$ via amplifier $A_X$. As a result, switches $C_{Xi}$, propagation lanes $U_{Xi}$ as delay elements, amplifier $A_X$, switches $C_{Yi}$, propagation lanes $U_{Yi}$ as delay elements, and amplifier $A_Y$ form eight oscillators $H_i$ (i=1, 2, . . . , 8). Oscillator $H_i$ enables the elastic wave position-sensing device in FIG. 6 to have a small-sized circuit with a simple structure. The small-sized circuit causes the elastic wave position-sensing device to have a small size which is very light in weight, and to be operated under low power consumption with low voltage. Though each interdigital transducer is located between each piezoelectric substrate and glass plate 1 in FIG. 6, each interdigital transducer is able to be located on the top surface, being not in touch with glass plate 1, of each piezoelectric substrate.

Compared with the elastic wave position-sensing device in FIG. 6, the elastic wave position-sensing device in FIG. 1 can be operated under still lower power consumption owing to the excitation of the unidirectional elastic wave. In addition, no reflection of an elastic wave generates at the side surface of the bilayer zone $L_{TXi}$ in FIG. 1 because of the excitation of the unidirectional elastic wave. Therefore, the elastic wave position-sensing device in FIG. 1 has little or no noise, so that has a still higher sensitivity.

Figure 9:
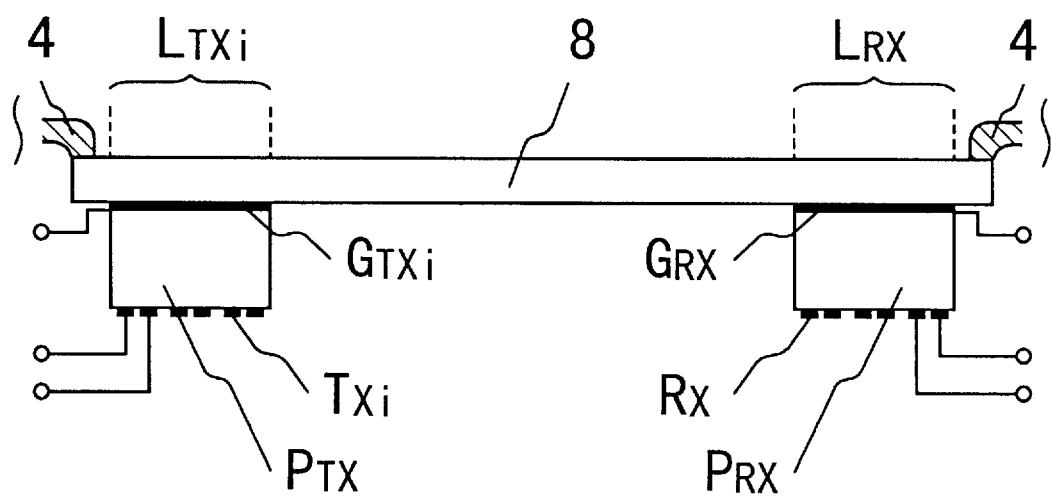
FIG. 9 shows a sectional view of an elastic wave position-sensing device according to a third embodiment of the present invention.

FIG. 9 shows a sectional view of an elastic wave position-sensing device according to a third embodiment of the present invention. The elastic wave position-sensing device in FIG. 9 has the same construction as the elastic wave position-sensing device in FIG. 1, except for dimension of each piezoelectric substrate, and using of glass plate 8 in place of glass plate 1. FIG. 9 shows only frame 4, glass plate 8, piezoelectric substrates $P_{TX}$, $P_{RX}$, interdigital transducers $T_{Xi}$, $R_X$, earth electrodes $G_{TXi}$ and $G_{RX}$. Glass plate 8 has a dimension of 1 mm in thickness. Each piezoelectric substrate has a dimension of 1 mm in thickness. Each interdigital transducer has an interdigital periodicity p of 1.6 mm, and has two kinds of distances between one electrode finger and two neighboring electrode fingers, the shorter distance xp being 400 μm. Display panel 2, which is not drawn in FIG. 9, is mounted on the central part of one end surface of glass plate 8 in the same way as FIG. 1. The elastic wave position-sensing device in FIG. 9 is operated in the same way as FIG. 1, and has the same effect as FIG. 1.

Figure 10:
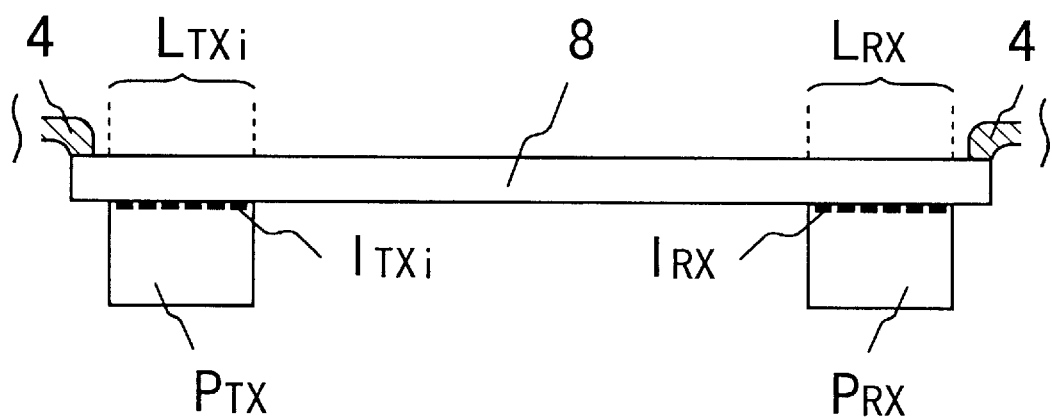
FIG. 10 shows a sectional view of an elastic wave position-sensing device according to a fourth embodiment of the present invention.

FIG. 10 shows a sectional view of an elastic wave position-sensing device according to a fourth embodiment of the present invention. The elastic wave position-sensing device in FIG. 10 has the same construction as the elastic wave position-sensing device in FIG. 6, except for dimension of each piezoelectric substrate, and using of glass plate 8 in place of glass plate 1. FIG. 10 shows only frame 4, glass plate 8, piezoelectric substrates $P_{TX}$, $P_{RX}$, interdigital transducers $I_{TXi}$ and $I_{RX}$. Each piezoelectric substrate has a dimension of 1 mm in thickness. Each interdigital transducer has an interdigital periodicity p of 1.6 mm. Display panel 2, which is not drawn in FIG. 10, is mounted on the central part of one end surface of glass plate 8 in the same way as FIG. 1. The elastic wave position-sensing device in FIG. 10 is operated in the same way as FIG. 6, and has the same effect as FIG. 6.

Compared with the elastic wave position-sensing device in FIG. 10, the elastic wave position-sensing device in FIG. 9 can be operated under still lower power consumption owing to the excitation of the unidirectional elastic wave. In addition, no reflection of an elastic wave generates at the side surface of the bilayer zone $L_{TXi}$ in FIG. 9 because of the excitation of the unidirectional elastic wave. Therefore, the elastic wave position-sensing device in FIG. 9 has little or no noise, so that has a still higher sensitivity.

Figure 11:
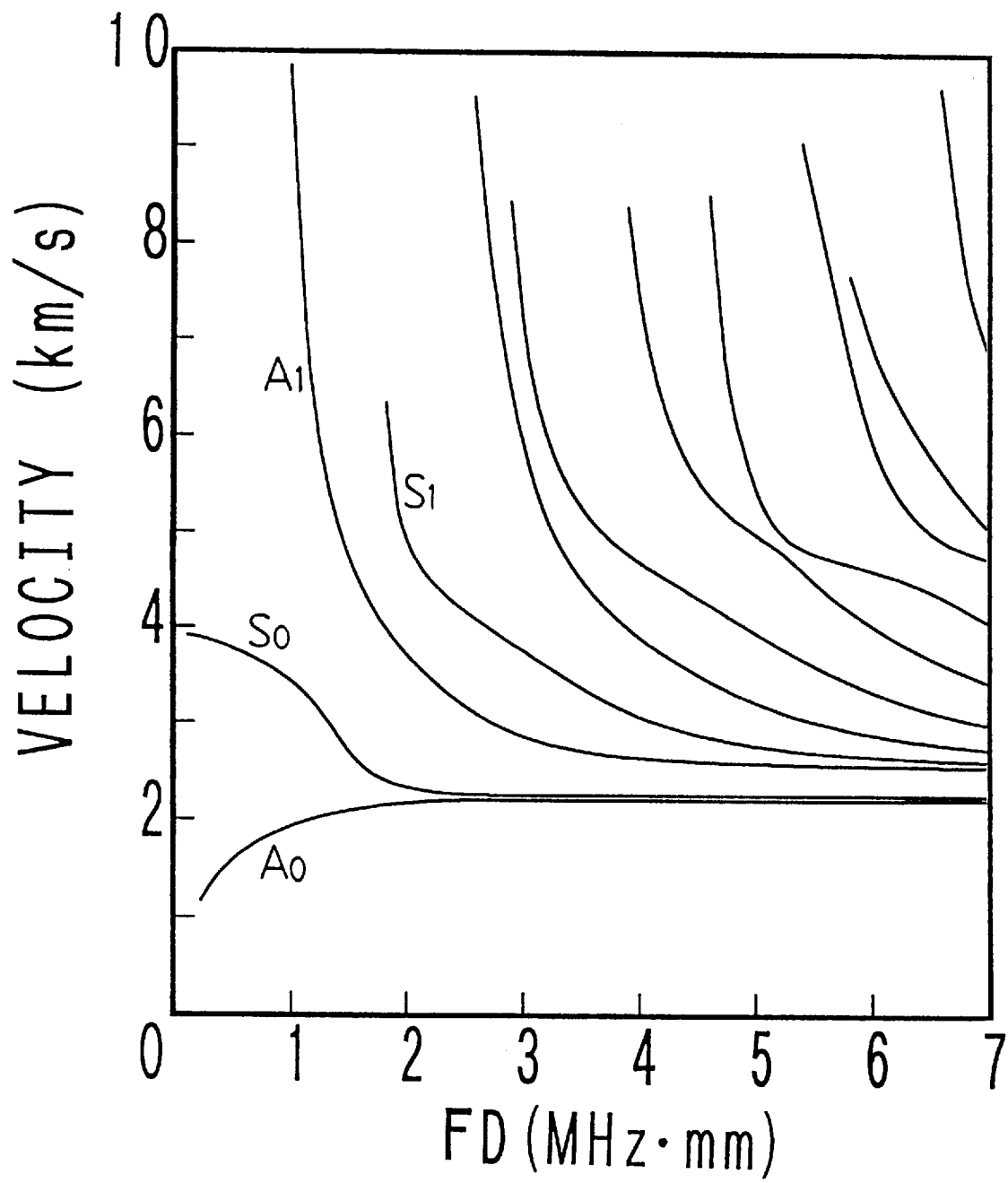
FIG. 11 shows a relationship between the phase velocity of the elastic wave for each mode in piezoelectric substrate $P_{TX}$ alone in FIG. 9, and the FD value.

FIG. 11 shows a relationship between the phase velocity of the elastic wave for each mode in piezoelectric substrate $P_{TX}$ alone in FIG. 9, and the product FD of the frequency F of the elastic wave and the thickness D of piezoelectric substrate $P_{TX}$. Piezoelectric substrate $P_{TX}$ has a shear wave (vg-t) velocity of 2450 m/s and a longitudinal wave (vg-1) velocity of 4390 m/s traveling the inside of piezoelectric substrate $P_{TX}$ alone.

Figure 12:
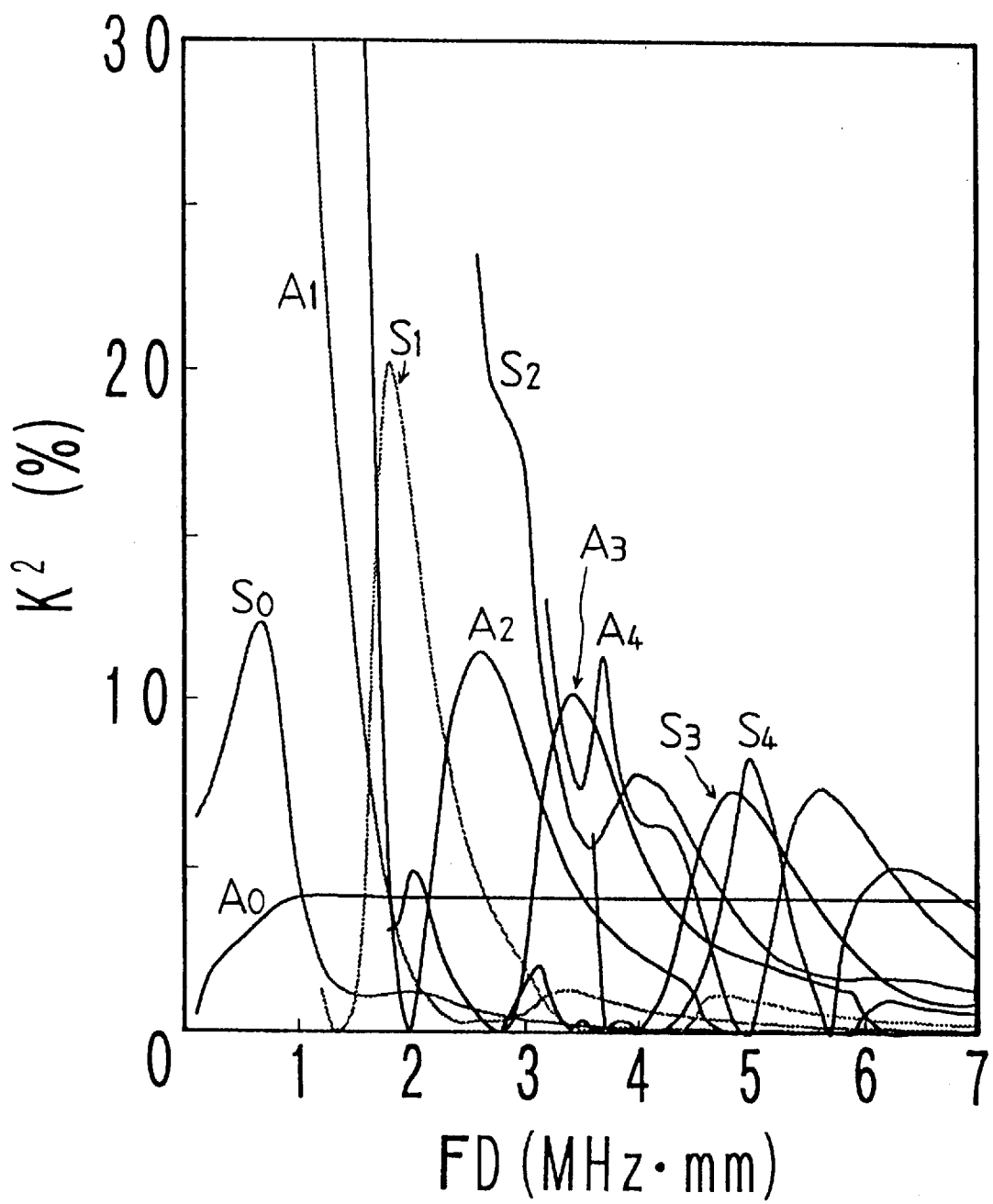
FIG. 12 shows a relationship between the FD value and the $K^2$ value.

FIG. 12 shows a relationship between the FD value and the $K^2$ value calculated from the difference between the phase velocity under electrically opened condition and that under electrically shorted condition of piezoelectric substrate $P_{TX}$ in the bilayer zone $L_{TXi}$ in FIG. 9. In FIG. 12, glass plate 8 is made from a glass having a shear wave velocity of 3091 m/s and a longitudinal wave velocity of 5592 m/s traveling the glass alone. The velocities of 3091 m/s and 5592 m/s are about 1.3 times the velocities of a shear- and a longitudinal waves, 2450 m/s and 4390 m/s, respectively, in piezoelectric substrate $P_{TX}$ alone. The $A_o$ mode elastic wave has the $K^2$ value under 5%. Accordingly, it is clear that the elastic wave of all the modes, except for the $A_o$ mode, that is the elastic wave of the $S_o$ mode and the higher order modes, is excited in the bilayer zone $L_{TXi}$ effectively. An electric energy applied to interdigital transducer $T_{Xi}$ is most effectively transduced to the $S_1$ mode elastic wave when the FD value is approximately 1.9 MHz·mm, then the $K^2$ value is approximately 20% being the maximum value. An electric energy applied to interdigital transducer $T_{Xi}$ is transduced to the higher order mode elastic wave sufficiently. In the same way, an electric energy applied to interdigital transducer $T_{Yi}$ is most effectively transduced to the $S_1$ mode elastic wave, and is transduced to the higher order mode elastic wave sufficiently. The elastic wave of the $S_o$ mode and the higher order modes is effectively transduced to an electric energy at interdigital transducers $R_X$ and $R_Y$, respectively.

Figure 13:
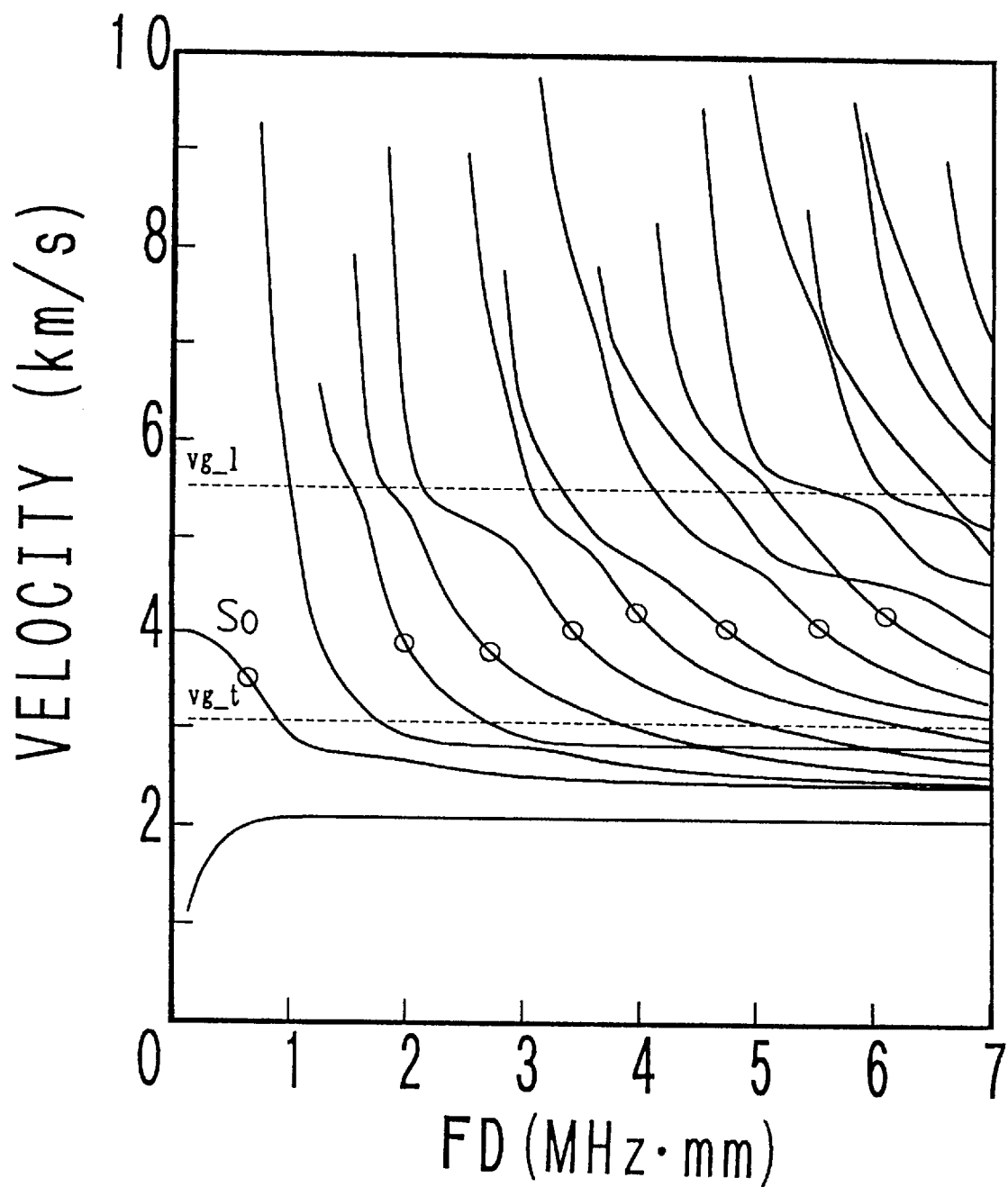
FIG. 13 shows a relationship between the phase velocity of the elastic wave for each mode in the bilayer zone $L_{TXi}$ in FIG. 9, and the FD value.

FIG. 13 shows a relationship between the phase velocity of the elastic wave for each mode in the bilayer zone $L_{TXi}$ in FIG. 9, and the FD value. In FIG. 13, glass plate 8 is made from the same glass as FIG. 12. The $V_{fd=0}$ value is 4070 m/s, the $V_{fd=0}$ value showing the phase velocity of the $S_o$ mode elastic wave, corresponding to a condition that the product FD of the frequency F of the elastic wave excited in the bilayer zone $L_{TXi}$ and the thickness D of piezoelectric substrate $P_{TX}$ is zero. Each point at the mark ○ shows the FD value in which an electric energy applied to interdigital transducer $T_{Xi}$ is most effectively transduced to the elastic wave of each mode, the FD value being calculated from the maximum $K^2$ value in FIG. 12. Also, each point at the mark ○ shows the phase velocity corresponding to the FD value with the maximum $K^2$ value, the phase velocity being approximately equal to the $V_{fd=0}$ value. Thus, the FD value, in which the phase velocity of the elastic wave in the bilayer zone $L_{TXi}$ is approximately equal to the $V_{fd=0}$ value, gives the maximum $K^2$ value. In the same way, the FD value, in which the phase velocity of the elastic wave in the bilayer zone $L_{TYi}$ is approximately equal to the $V_{fd=0}$ value, gives the maximum $K^2$ value. Moreover, the FD value, in which the phase velocity of the elastic wave in the bilayer zone $L_{RX}$ or $L_{RY}$ is approximately equal to the $V_{fd=0}$ value, gives the maximum $K^2$ value, the $V_{fd=0}$ value showing the phase velocity of the $S_o$ mode elastic wave, corresponding to a condition that the product FD of the frequency F of the elastic wave transmitted to the bilayer zone $L_{RX}$ or $L_{RY}$ and the thickness D of piezoelectric substrate $P_{RX}$ or $P_{RY}$ is zero.

Figure 14:
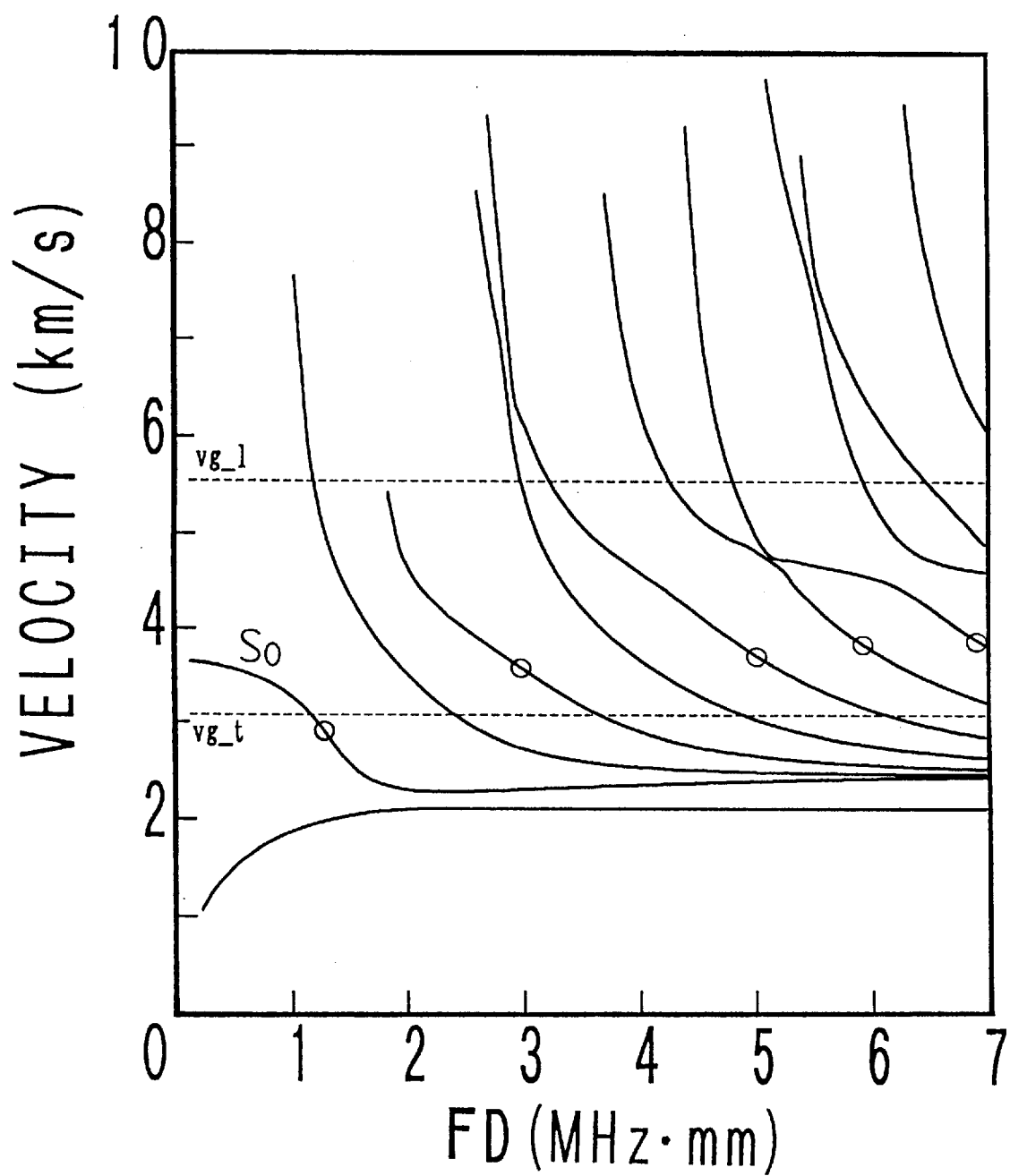
FIG. 14 shows a relationship between the phase velocity of the elastic wave for each mode in the bilayer zone $L_{TXi}$ in FIG. 1, and the FD value.

FIG. 14 shows a relationship between the phase velocity of the elastic wave for each mode in the bilayer zone $L_{TXi}$ in FIG. 1, and the FD value. In FIG. 14, glass plate 1 is made from the same glass as FIG. 12. The $V_{fd=0}$ value is 3650 m/s. The phase velocity of the elastic wave at the mark ○ is approximately equal to the $V_{fd=0}$ value.

Figure 15:
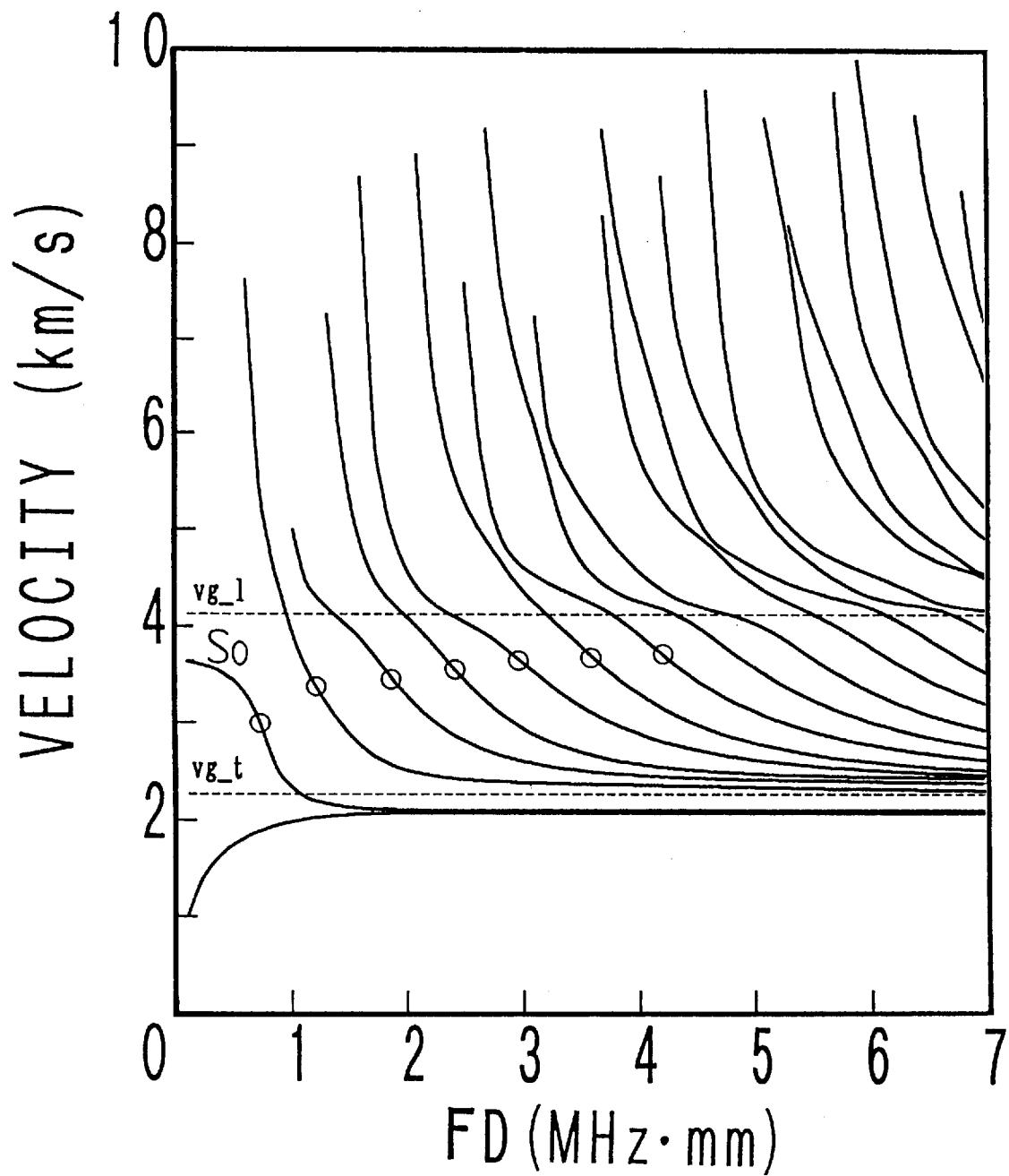
FIG. 15 shows a relationship between the phase velocity of the elastic wave for each mode in the bilayer zone $L_{TXi}$ in FIG. 9, and the FD value.

FIG. 15 shows a relationship between the phase velocity of the elastic wave for each mode in the bilayer zone $L_{TXi}$ in FIG. 9, and the FD value. In FIG. 15, glass plate 8 is made from a glass having a shear wave velocity of 2297 m/s and a longitudinal wave velocity of 4155 m/s traveling the glass alone. The velocities of 2297 m/s and 4155 m/s are about 0.9 times the velocities of a shear- and a longitudinal waves, 2450 m/s and 4390 m/s, respectively, in piezoelectric substrate $P_{TX}$ alone. The $V_{fd=0}$ value is 3670 m/s. The phase velocity of the elastic wave at the mark ○ is approximately equal to the $V_{fd=0}$ value.

Figure 16:
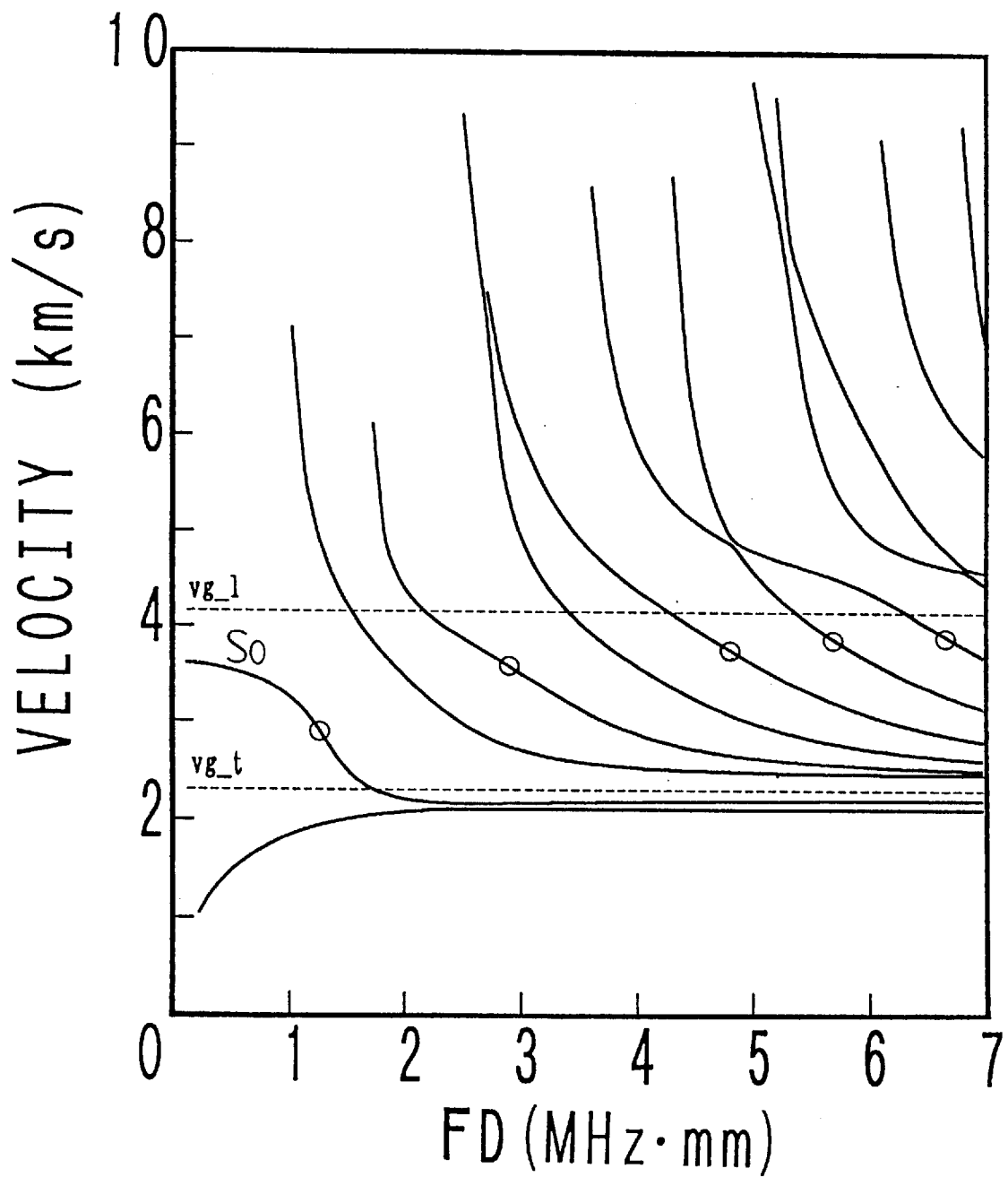
FIG. 16 shows a relationship between the phase velocity of the elastic wave for each mode in the bilayer zone $L_{TXi}$ in FIG. 1, and the FD value.

FIG. 16 shows a relationship between the phase velocity of the elastic wave for each mode in the bilayer zone $L_{TXi}$ in FIG. 1, and the FD value. In FIG. 16, glass plate 1 is made from the same glass as FIG. 15. The $V_{fd=0}$ value is 3600 m/s. The phase velocity of the elastic wave at the mark ○ is approximately equal to the $V_{fd=0}$ value.

It is clear from FIGS. 13~16 that the phase velocity at the FD value providing the maximum $K^2$ value is approximately equal to the $V_{fd=0}$ value. In addition, an electric energy applied to interdigital transducer $T_{Xi}$ or $T_{Yi}$ is transduced to the elastic wave effectively in the bilayer zone $L_{TXi}$ or $L_{TYi}$ in FIG. 9, compared with FIG. 1. In the same way, the elastic wave transmitted to the bilayer zone $L_{RX}$ or $L_{RY}$ is transduced to an electric energy effectively at interdigital transducer $R_X$ or $R_Y$ in FIG. 9, compared with FIG. 1. Thus, a transducing efficiency from an electric energy to an elastic wave, or from an elastic wave to an electric energy increases, when each piezoelectric substrate has substantially the same dimension in thickness as each glass plate. In addition, the transducing efficiency increases when the phase velocity of the elastic wave in each glass plate alone is about 0.9~1.3 times the velocity of the elastic wave in each piezoelectric substrate alone, that is, when the phase velocity of the elastic wave in each glass plate alone is approximately equal to that in each piezoelectric substrate alone.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. An elastic wave position-sensing device comprising:
   at least two elastic wave transducing units X and Y, each thereof consisting of
   a piezoelectric substrate $P_T$ having two end surfaces running perpendicular to the direction of the thickness D thereof, and comprising N piezoelectric parts $P_{Ti}$ (i=1, 2, . . . , N),
   a piezoelectric substrate $P_R$ having two end surfaces running perpendicular to the direction of the thickness D thereof,
   N interdigital transducers $I_{Ti}$ (i=1, 2, . . . , N), each thereof being formed on one end surface of each of said piezoelectric parts $P_{Ti}$, said thickness D of said piezoelectric substrate $P_T$ being approximately equal to or smaller than an interdigital periodicity p of said interdigital transducer $I_{Ti}$,
   an interdigital transducer $I_R$ formed on one end surface of said piezoelectric substrate $P_R$ and having an interdigital periodicity equal to said interdigital periodicity p, said thickness D of said piezoelectric substrate $P_R$ being approximately equal to or smaller than said interdigital periodicity p, and
   N switches $C_i$ (i=1, 2, . . . , N), an output terminal of each thereof being connected with an input terminal of each of said interdigital transducers $I_{Ti}$;
   a nonpiezoelectric plate having two end surfaces, the thickness of said nonpiezoelectric plate being equal to or smaller than said thickness D of said piezoelectric substrates $P_T$ and $P_R$, said piezoelectric substrates $P_T$ and $P_R$ being mounted on one or the other end surface of said nonpiezoelectric plate, said nonpiezoelectric plate comprising N nonpiezoelectric parts $_{Ti}$ (i=1, 2, . . . , N) adjacent to said piezoelectric parts $P_{Ti}$, a nonpiezoelectric part $_R$ adjacent to said piezoelectric substrate $P_R$, and the remaining nonpiezoelectric part;
   a display panel, mounted on said one end surface of said nonpiezoelectric plate; and
   a controlling system connected with said elastic wave transducing units X and Y, and said display panel,
   said piezoelectric substrates $P_T$ and $P_R$, and said nonpiezoelectric plate forming
      N bilayer zones $L_{Ti}$ (i=1, 2, . . . , N) consisting of said piezoelectric parts $P_{Ti}$ and said nonpiezoelectric parts $_{Ti}$,
      a bilayer zone $L_R$ consisting of said piezoelectric substrate $P_R$ and said nonpiezoelectric part $_R$, and
      a monolayer zone between said bilayer zones $L_{Ti}$ and said bilayer zone $L_R$, and consisting of said remaining nonpiezoelectric part,
   said interdigital transducer $I_{Ti}$ receiving an electric signal $E_T$ with a frequency approximately corresponding to said interdigital periodicity p, exciting an elastic wave of the $S_o$ mode and the higher order modes in said bilayer zone $L_{Ti}$, and transmitting said elastic wave, having the wavelength approximately equal to said interdigital periodicity p, to said bilayer zone $L_R$ through said monolayer zone, the phase velocity of said elastic wave being approximately equal to the phase velocity $V_{fd=0}$, of the $S_o$ mode elastic wave, corresponding to a condition that the product FD of the frequency F of said elastic wave and said thickness D of said piezoelectric substrate $P_T$ is zero,
   said interdigital transducer $I_R$ transducing said elastic wave in said bilayer zone $L_R$ to an electric signal $E_R$ with a frequency approximately corresponding to said interdigital periodicity p,
   said nonpiezoelectric plate being made of a material such that the phase velocity of the elastic wave in said nonpiezoelectric plate alone is approximately equal to that in said piezoelectric substrates $P_T$ and $P_R$ alone,
   said controlling system turning on and off said switches $C_i$ with a fixed period in turn, keeping a check on a magnitude of said electric signal $E_R$, sensing a touch with a finger or others under a fixed or more pressure on the other end surface of said nonpiezoelectric plate by a decrease or a disappearance in magnitude of said electric signal $E_R$, picking out one of said switches $C_i$ turned on when said decrease or said disappearance in magnitude of said electric signal $E_R$ happens, specifying a touch-position corresponding with the picked out switch $C_i$, and producing an image corresponding to said touch-position on said display panel, said elastic wave transducing unit X having N propagation lanes $U_{Xi}$ (i=1, 2, ..., N) of the elastic wave in said monolayer zone between said bilayer zones $L_{Ti}$ and $L_R$, two neighbors of said propagation lanes $U_{Xi}$ being closed or partially overlapping each other, said elastic wave transducing unit Y having N propagation lanes $U_{Yi}$ (i=1, 2, ..., N) of the elastic wave in said monolayer zone between said bilayer zones $L_{Ti}$ and $L_R$, two neighbors of said propagation lanes $U_{Yi}$ being closed or partially overlapping each other, said propagation lane $U_{Xi}$ being vertical to said propagation lane $U_{Yi}$.

2. An elastic wave position-sensing device as defined in claim 1, wherein said nonpiezoelectric plate is made of a glass.

3. An elastic wave position-sensing device as defined in claim 1, wherein said piezoelectric substrates $P_T$ and $P_R$ are made of a piezoelectric ceramic, the polarization axis thereof being parallel to the direction of said thickness D thereof.

4. An elastic wave position-sensing device as defined in claim 1, wherein said piezoelectric substrates $P_T$ and $P_R$ are made of a piezoelectric polymer.

5. An elastic wave position-sensing device as defined in claim 1, wherein said display panel is made of a material such that the phase velocity of the elastic wave in said display panel is higher than that in said nonpiezoelectric plate alone.

6. An elastic wave position-sensing device as defined in claim 1 further comprising:
   an amplifier $A_X$, an input terminal of said switch $C_i$ in said elastic wave transducing unit Y being connected with an output terminal of said interdigital transducer $I_R$ in said elastic wave transducing unit X via said amplifier $A_X$; and
   an amplifier $A_Y$, an input terminal of said switch $C_i$ in said elastic wave transducing unit X being connected with an output terminal of said interdigital transducer $I_R$ in said elastic wave transducing unit Y via said amplifier $A_Y$,
   said switches $C_i$ in said elastic wave transducing unit X, said propagation lanes $U_{Xi}$ as delay elements, said amplifier $A_X$, said switches $C_i$ in said elastic wave transducing unit Y, said propagation lanes $U_{Yi}$ as delay elements, and said amplifier $A_Y$ forming N oscillators $H_i$ (i=1, 2, ..., N).

7. An elastic wave position-sensing device comprising:
   at least two elastic wave transducing units X and Y, each thereof consisting of
      a piezoelectric substrate $P_T$ having two end surfaces running perpendicular to the direction of the thickness D thereof, and comprising N piezoelectric parts $P_{Ti}$ (i=1, 2, ..., N),
      a piezoelectric substrate $P_R$ having two end surfaces running perpendicular to the direction of the thickness D thereof,
      N interdigital transducers $T_i$ (i=1, 2, ..., N), each thereof being formed on one end surface of each of said piezoelectric parts $P_{Ti}$, each of said interdigital transducers $T_i$ consisting of two electrodes $T_{i-1}$ and $T_{i-2}$ and having two kinds of distances between one electrode finger of said electrode $T_{i-1}$ and two neighboring electrode fingers of said electrode $T_{i-2}$, said thickness D of said piezoelectric substrate $P_T$ being approximately equal to or smaller than an interdigital periodicity p of said interdigital transducer $T_i$,
      an interdigital transducer R formed on one end surface of said piezoelectric substrate $P_R$, consisting of two electrodes $R_{-1}$ and $R_{-2}$, and having two kinds of distances between one electrode finger of said electrode $R_{-1}$ and two neighboring electrode fingers of said electrode $R_{-2}$, said thickness D of said piezoelectric substrate $P_R$ being approximately equal to or smaller than an interdigital periodicity p of said interdigital transducer R,
      N earth electrodes $G_{Ti}$ (i=1, 2, ..., N), each thereof being formed on the other end surface of each of said piezoelectric parts $P_{Ti}$,
      an earth electrode $G_R$ formed on the other end surface of said piezoelectric substrate $P_R$,
      a phase shifter $S_T$ including at least a coil $L_1$,
      a phase shifter $S_R$ including at least a coil $L_2$, and
      N pairs of switches $W_i$ (i=1, 2, ..., N), each pair of switches $W_i$ consisting of two switches $W_{i-1}$ and $W_{i-2}$, and output terminals of said switches $W_{i-1}$ and $W_{i-2}$ being connected with input terminals of said electrodes $T_{i-1}$ and $T_{i-2}$, respectively;
   a nonpiezoelectric plate having two end surfaces, the thickness of said nonpiezoelectric plate being equal to or smaller than said thickness D of said piezoelectric substrates $P_T$ and $P_R$, said piezoelectric substrates $P_T$ and $P_R$ being mounted on one or the other end surface of said nonpiezoelectric plate through said earth electrodes $G_{Ti}$ and $G_R$, respectively, said nonpiezoelectric plate comprising N nonpiezoelectric parts $_{Ti}$ (i=1, 2, ..., N) adjacent to said piezoelectric parts $P_{Ti}$, a nonpiezoelectric part $_R$ adjacent to said piezoelectric substrate $P_R$, and the remaining nonpiezoelectric part;
   a display panel, mounted on said one end surface of said nonpiezoelectric plate; and
   a controlling system connected with said two elastic wave transducing units X and Y, and said display panel,
      said piezoelectric substrates $P_T$ and $P_R$, and said nonpiezoelectric plate forming
         N bilayer zones $L_{Ti}$ (i=1, 2, ..., N) consisting of said piezoelectric parts $P_{Ti}$ and said nonpiezoelectric parts $_{Ti}$,
         a bilayer zone $L_R$ consisting of said piezoelectric substrate $P_R$ and said nonpiezoelectric part $_R$, and
         a monolayer zone between said bilayer zones $L_{Ti}$ and said bilayer zone $L_R$, and consisting of said remaining nonpiezoelectric part,
      said interdigital transducer $T_i$ and said earth electrode $G_{Ti}$ receiving an electric signal $E_{T1}$ between said electrode $T_{i-1}$ and said earth electrode $G_{Ti}$, and an electric signal $E_{T2}$ between said electrode $T_{i-2}$ and said earth electrode $G_{Ti}$ via said phase shifter $S_T$, exciting an elastic wave of the $S_o$ mode and the higher order modes in said bilayer zone $L_{Ti}$, and transmitting said elastic wave, having the wavelength approximately equal to said interdigital periodicity p of said interdigital transducer $T_i$, to said bilayer zone $L_R$ through said monolayer zone, each of said electric signals $E_{T1}$ and $E_{T2}$ having a frequency approximately corresponding to said interdigital periodicity p of said interdigital transducer $T_i$, the phase difference between said electric signals $E_{T1}$ and $E_{T2}$ being $2\pi y$, the phase velocity of said elastic wave being approximately equal to the phase velocity $V_{fd=0}$, of the $S_o$ mode elastic wave, corresponding to a condition that the product FD of the frequency F of said elastic wave and said thickness D of said piezoelectric substrate $P_T$ is zero, said interdigital transducer R and said earth electrode $G_R$ transducing said elastic wave in said bilayer zone $L_R$, with wavelength approximately equal to said interdigital periodicity p of said interdigital transducer R, to an electric signal $E_{R1}$ between said electrode $R_{-1}$ and said earth electrode $G_R$, and an electric signal $E_{R2}$ between said electrode $R_{-2}$ and said earth electrode $G_R$, each of said electric signals $E_{R1}$ and $E_{R2}$ having a frequency approximately corresponding to said interdigital periodicity p of said interdigital transducer R, the phase difference between said electric signals $E_{R1}$ and $E_{R2}$ being $2\pi y$, said phase shifter $S_R$ combining said electric signals $E_{R1}$ and $E_{R2}$, and delivering a combined electric signal $E_R$, said nonpiezoelectric plate being made of a material such that the phase velocity of the elastic wave in said nonpiezoelectric plate alone is approximately equal to that in said piezoelectric substrates $P_T$ and $P_R$ alone, said controlling system turning on and off said pairs of switches $W_i$ with a fixed period in turn, keeping a check on a magnitude of said electric signal $E_R$, sensing a touch with a finger or others under a fixed or more pressure on the other end surface of said nonpiezoelectric plate by a decrease or a disappearance in magnitude of said electric signal $E_R$, picking out said pair of switches $W_i$ turned on when said decrease or said disappearance in magnitude of said electric signal $E_R$ happens, specifying a touch-position corresponding with the picked out pair of switches $W_i$, and producing an image corresponding to said touch-position on said display panel, said elastic wave transducing unit X having N propagation lanes $U_{Xi}$ (i=1, 2, . . . , N) of the elastic wave in said monolayer zone between said bilayer zones $L_{Ti}$ and $L_R$ in said elastic wave transducing unit X, two neighbors of said propagation lanes $U_{Xi}$ being closed or partially overlapping each other, said elastic wave transducing unit Y having N propagation lanes $U_{Yi}$ (i=1, 2, . . . , N) of the elastic wave in said monolayer zone between said bilayer zones $L_{Ti}$ and $L_R$ in said elastic wave transducing unit Y, two neighbors of said propagation lanes $U_{Yi}$ being closed or partially overlapping each other, said propagation lane $U_{Xi}$ being vertical to said propagation lane $U_{Yi}$.

8. An elastic wave position-sensing device as defined in claim 7, wherein $x<\frac{1}{2}$ in a shorter distance xp of said two kinds of distances between one electrode finger of said electrode $T_{i-1}$ and two neighboring electrode fingers of said electrode $T_{i-2}$, $x<\frac{1}{2}$ in a shorter distance xp of said two kinds of distances between one electrode finger of said electrode $R_{-1}$ and two neighboring electrode fingers of said electrode $R_{-2}$, $x+y=\pm\frac{1}{2}$ in said phase difference $2\pi y$ between said electric signals $E_{T1}$ and $E_{T2}$, and $x+y=\pm\frac{1}{2}$ in said phase difference $2\pi y$ between said electric signals $E_{R1}$ and $E_{R2}$.

9. An elastic wave position-sensing device as defined in claim 7, wherein said nonpiezoelectric plate is made of a glass.

10. An elastic wave position-sensing device as defined in claim 7, wherein said piezoelectric substrates $P_T$ and $P_R$ are made of a piezoelectric ceramic, the polarization axis thereof being parallel to the direction of said thickness D thereof.

11. An elastic wave position-sensing device as defined in claim 7, wherein said piezoelectric substrates $P_T$ and $P_R$ are made of a piezoelectric polymer.

12. An elastic wave position-sensing device as defined in claim 7, wherein said display panel is made of a material such that the phase velocity of the elastic wave in said display panel is higher than that in said nonpiezoelectric plate alone.

13. An elastic wave position-sensing device as defined in claim 7 further comprising:

an amplifier $A_X$, an input terminal of said phase shifter $S_T$ in said elastic wave transducing unit Y being connected with an output terminal of said phase shifter $S_R$ in said elastic wave transducing unit X via said amplifier $A_X$; and an amplifier $A_Y$, an input terminal of said phase shifter $S_T$ in said elastic wave transducing unit X being connected with an output terminal of said phase shifter $S_R$ in said elastic wave transducing unit Y via said amplifier $A_Y$, said phase shifter $S_T$ in said elastic wave transducing unit X, said pairs of switches $W_i$ in said elastic wave transducing unit X, said propagation lanes $U_{Xi}$ as delay elements, said phase shifter $S_R$ in said elastic wave transducing unit X, said amplifier $A_X$, said phase shifter $S_T$ in said elastic wave transducing unit Y, said pairs of switches $W_i$ in said elastic wave transducing unit Y, said propagation lanes $U_{Yi}$ as delay elements, said phase shifter $S_R$ in said elastic wave transducing unit Y, and said amplifier $A_Y$ forming N oscillators $H_i$ (i=1, 2, . . . , N).

* * * * *